United States Patent
Chang et al.

(10) Patent No.: US 10,856,518 B2
(45) Date of Patent: Dec. 8, 2020

(54) EXCREMENT COLLECTION DEVICE AND SMART EXCREMENT COLLECTION SYSTEM COMPRISING SAME

(71) Applicant: CATDID TECHNOLOGY COMPANY LIMITED, Taipei (TW)

(72) Inventors: Chin-Jung Chang, Taipei (TW); Yen-Shan Chuang, Taipei (TW)

(73) Assignee: CATDID TECHNOLOGY COMPANY LIMITED, Taipei (TW)

( * ) Notice: Subject to any disclaimer, the term of this patent is extended or adjusted under 35 U.S.C. 154(b) by 165 days.

(21) Appl. No.: 16/258,716

(22) Filed: Jan. 28, 2019

(65) Prior Publication Data

US 2019/0230892 A1     Aug. 1, 2019

(30) Foreign Application Priority Data

Jan. 30, 2018   (TW) ............................. 107103309 A

(51) Int. Cl.
*A01K 1/01*     (2006.01)
*A01K 29/00*    (2006.01)

(52) U.S. Cl.
CPC ............ *A01K 1/011* (2013.01); *A01K 1/0117* (2013.01); *A01K 29/005* (2013.01)

(58) Field of Classification Search
CPC .... A01K 11/008; A01K 1/0107; A01K 1/011; A01K 1/0114; A01K 1/0117; A01K 1/0152; A01K 23/005

USPC .......................... 119/166, 165, 163, 164, 421
See application file for complete search history.

(56) References Cited

U.S. PATENT DOCUMENTS

| | | | | |
|---|---|---|---|---|
| 4,465,018 A | * | 8/1984 | Mopper .............. | A01K 1/0117 119/164 |
| 8,578,887 B2 | * | 11/2013 | Andrade ............. | A01K 1/0114 119/166 |
| 8,733,287 B2 | * | 5/2014 | Huck .................. | A01K 1/0107 119/165 |
| 8,746,178 B2 | * | 6/2014 | Greene ............... | A01K 5/0114 119/421 |

* cited by examiner

*Primary Examiner* — Yvonne R Abbott-Lewis
(74) *Attorney, Agent, or Firm* — Schmeiser, Olsen & Watts, LLP

(57) ABSTRACT

An excrement collection device includes a casing having a bottom wall, two opposing first outer sidewalls, and a second outer sidewall connecting the first outer sidewalls; a receiving space defined by the bottom wall, the first outer sidewalls, and the second outer sidewall and divided into a temporary storage region and a collection region, with the temporary storage region disposed between the second outer sidewall and the collection region; a cleansing component disposed in the temporary storage region; and a support component disposed at the top of the temporary storage region and having rotatable support boards. Excrement left behind at home by pets because of defecation and urination is gathered in the collection region to thereby spare pet keepers the hassles of frequent cleansing, prevent exposure of the excrement to air for a long period of time, and preclude a foul-smelling odor otherwise lingering at home.

22 Claims, 14 Drawing Sheets

43

10

EXCREMENT COLLECTION DEVICE AND SMART EXCREMENT COLLECTION SYSTEM COMPRISING SAME

CROSS-REFERENCE TO RELATED APPLICATION

This non-provisional application claims priority under 35 U.S.C. § 119(a) on Patent Application No(s). 107103309 filed in Taiwan, R.O.C. on Jan. 30, 2018, the entire contents of which are hereby incorporated by reference.

FIELD OF THE INVENTION

The present disclosure relates to an excrement collection device and an excrement collection system comprising the same and, more particularly, to an excrement collection device capable of automatically cleansing and collecting pet excrement and a smart excrement collection system comprising the same.

BACKGROUND OF THE INVENTION

Training pets (for example, dogs and cats) to defecate and urinate at home has advantages as follows: reducing time spent outdoors, allowing the pets to defecate and urinate regardless of weather, allowing the pets to defecate and urinate at any time, thereby sparing the pets the hassles of suppressing the urge to defecate and urinate to the detriment of their health.

However, excrement left behind by the pets at home often keeps pet keepers busy cleansing. Furthermore, foul-smelling excrement at home is annoying. The aforesaid situations are especially severe when it comes to those pet keepers who often allow their pets to stay at home while they are working overtime, traveling on business, or travelling on vacation.

Therefore, it is important to provide an excrement collection device which addresses the aforesaid issues.

SUMMARY OF THE INVENTION

An objective of the present disclosure is to provide an excrement collection device capable of automatically cleansing and collecting pet excrement and thus ensuring home environment quality which might otherwise deteriorate whenever pet keepers keep pets at home alone for a long period of time and fail to dispose of pet excrement properly.

In order to achieve the above and other objectives, the present disclosure provides an excrement collection device, comprising: a casing comprising a bottom wall, two opposing first outer sidewalls, and a second outer sidewall connecting the first outer sidewalls; a receiving space defined by the bottom wall, the first outer sidewalls, and the second outer sidewall and divided into a temporary storage region and a collection region, with the temporary storage region disposed between the second outer sidewalls and the collection region; a cleansing component disposed in the temporary storage region; and a support component disposed at a top of the temporary storage region and comprising a plurality of rotatable support boards.

In an embodiment of the present disclosure, the cleansing component comprises: a push harrow having a plurality of blades; a push rod for carrying the push harrow and pushing the push harrow, causing the push harrow to move within the temporary storage region along a specific route; a rotation harrow disposed at a junction of the temporary storage region and the collection region and having a plurality of L-shaped grates; and a rotation rod for carrying the rotation harrow and rotating the rotation harrow.

In an embodiment of the present disclosure, the push harrow has a sand plate disposed at a top of the blades and movable to a bottom of the blades.

In an embodiment of the present disclosure, a top of each said rotatable support board has a plurality of troughs each extending along two long sides of the rotatable support board.

In an embodiment of the present disclosure, the casing further comprises a urine drainage channel for draining urine from the troughs to the collection region.

In an embodiment of the present disclosure, the troughs have at least one of a hydrophobic coating and a photocatalyst coating.

In an embodiment of the present disclosure, the excrement collection device further comprises: a collection box disposed in the collection region and having a feces collection component and a urine collection component, the urine drainage channel draining urine to the urine collection component, and the cleansing component pushing feces in the temporary storage zone to the feces collection component.

In an embodiment of the present disclosure, the collection box further comprises an odor processing component in communication with at least one of the feces collection component and the urine collection component.

In an embodiment of the present disclosure, the collection box further comprises a urine processing component being in communication with the urine collection component and feeding automatically a specific liquid to the urine collection component.

In an embodiment of the present disclosure, the rotatable support boards each comprise: a rotating shaft disposed on a long side of each said rotatable support board to rotate the rotatable support board; an engaging slot disposed on another long side of each said rotatable support board to engage with the rotating shaft of an adjacent one of the rotatable support boards; and a rotation control element disposed on at least one of the first outer sidewalls to rotate the rotating shaft of each said rotatable support board.

In an embodiment of the present disclosure, the support component further comprises a fence corresponding in position to the first outer sidewalls and the second outer sidewall.

In an embodiment of the present disclosure, the support component further comprises a plurality of linkages, at least a power source and at least a driving element, the power source being connected to the driving element, the linkages being disposed at two short edges of each said rotatable support board, the linkages each comprising a long rod, a short rod and a connecting rod, wherein an end of the long rod and an end of the short rod are pivotally connected to the short edges of each said rotatable support board, the long rod having another end pivotally connected to the casing, the short rod having another end pivotally connected to the driving element, wherein the connecting rod has an end pivotally connected between two ends of the long rod and another end pivotally connected to another end of the short rod.

In an embodiment of the present disclosure, an end of the rotation rod has a rotation gear, and the support component further comprises a plurality of linkages, at least a power source and at least a driving element, the power source being connected to the driving element, wherein an end portion of the driving element has a forwarding rack, with the linkages disposed at two short edges of each said rotatable support board, wherein the linkages each comprise a long rod, a short rod and a connecting rod, wherein an end of the long rod and an end of the short rod are pivotally connected to short edges of each said rotatable support board, wherein another end of the long rod is pivotally connected to the casing, wherein another end of the short rod is pivotally connected to the driving element, wherein the connecting rod has an end pivotally connected between two ends of the long rod and another end pivotally connected to another end of the short rod, wherein the forwarding rack drives the rotation gear while the rotatable support boards are rotating to change from lying to tilting, wherein the forwarding rack separates from the rotation gear after the rotatable support boards have rotated to change from tilting to lying.

In an embodiment of the present disclosure, the rotatable support boards each comprise two support stands, a support board and a demountable fixing element, the support stands each having a fixing slot, with a fixing flange disposed on each of two short edges of the support board, with the fixing flanges disposed in the fixing slots, respectively, with the demountable fixing element adapted to fix the support board to the support stands.

In an embodiment of the present disclosure, the rotatable support boards each comprise a support board, a substrate and a magnet component, the substrate being smaller than the support board, wherein the support board and the substrate are attracted to each other because of the magnet component, the substrate driving the support board to rotate, wherein a point of pivotal connection of the substrate and the support board corresponds in position to a rotation side of the rotatable support boards.

In an embodiment of the present disclosure, the excrement collection device further comprises: a sensing component for sensing a state of cleansing sand and excrement in the receiving space or the support component; and an information integration component for collecting sensing-related results of the sensing component and controlling the excrement collection device in accordance with the sensing-related results.

In an embodiment of the present disclosure, the sensing component comprises at least a first sensor disposed at the support component.

In an embodiment of the present disclosure, the sensing component comprises at least a second sensor disposed in the collection region.

In an embodiment of the present disclosure, the sensing component comprises at least a third sensor disposed in the temporary storage region.

In an embodiment of the present disclosure, the excrement collection device further comprises a living thing electronic wearable device sensed by the sensing component.

In order to achieve the above and other objectives, the present disclosure provides an smart excrement collection system, comprising: the excrement collection device, wherein the information integration component further comprises a wireless transmitter for transmitting information collected by the information integration component; a cloud database for receiving, storing and transmitting information transmitted from the wireless transmitter; and a receiving device for directly receiving information transmitted from the wireless transmitter or accessing information stored in the cloud database.

In an embodiment of the present disclosure, the cloud database further integrates and analyzes information transmitted from the wireless transmitter and sends a reminder to the receiving device.

Given the excrement collection device in an embodiment of the present disclosure, excrement left behind at home by pets because of defecation and urination is gathered in the collection region to thereby spare pet keepers the hassles of frequent cleansing, prevent exposure of the excrement to air for a long period of time, and preclude a foul-smelling odor otherwise lingering at home. Even if the pet keepers allow their pets to stay at home while they are working overtime, traveling on business, or travelling on vacation, the excrement collection device will keep operating, thereby overcoming known drawbacks of the prior art.

In a smart excrement collection system according to an embodiment of the present disclosure, the sensing component monitors the state of the excrement collection device in real time. Hence, even if their pets are not around, the pet keepers can still be informed, by the excrement collection device's information integration component, the cloud database and the pet keepers' receiving devices (such as cellular phones), of collection state of the excrement in the excrement collection device, so as to gain insight into the pets' physical condition and determine whether to cleanse the excrement collection device or replace consumables. This is beneficial to those pet keepers who are unable to accompany their pets for a long period of time, because related information is provided to the pet keepers conveniently and instantly.

DETAILED DESCRIPTION OF THE PREFERRED EMBODIMENTS

Objectives, features, and advantages of the present disclosure are hereunder illustrated with specific embodiments, depicted with drawings, and described below. The present disclosure may be implemented or applied in any other different specific embodiments. Details disclosed herein are subject to various modifications and changes without departing from the spirit of the present disclosure when based on different viewpoints and applications. Moreover, accompanying drawings of the present disclosure serve illustrative purposes and are not drawn to scale. The embodiments below are illustrative of the present disclosure rather than restrictive of the claims of the present disclosure.

Figure 1:
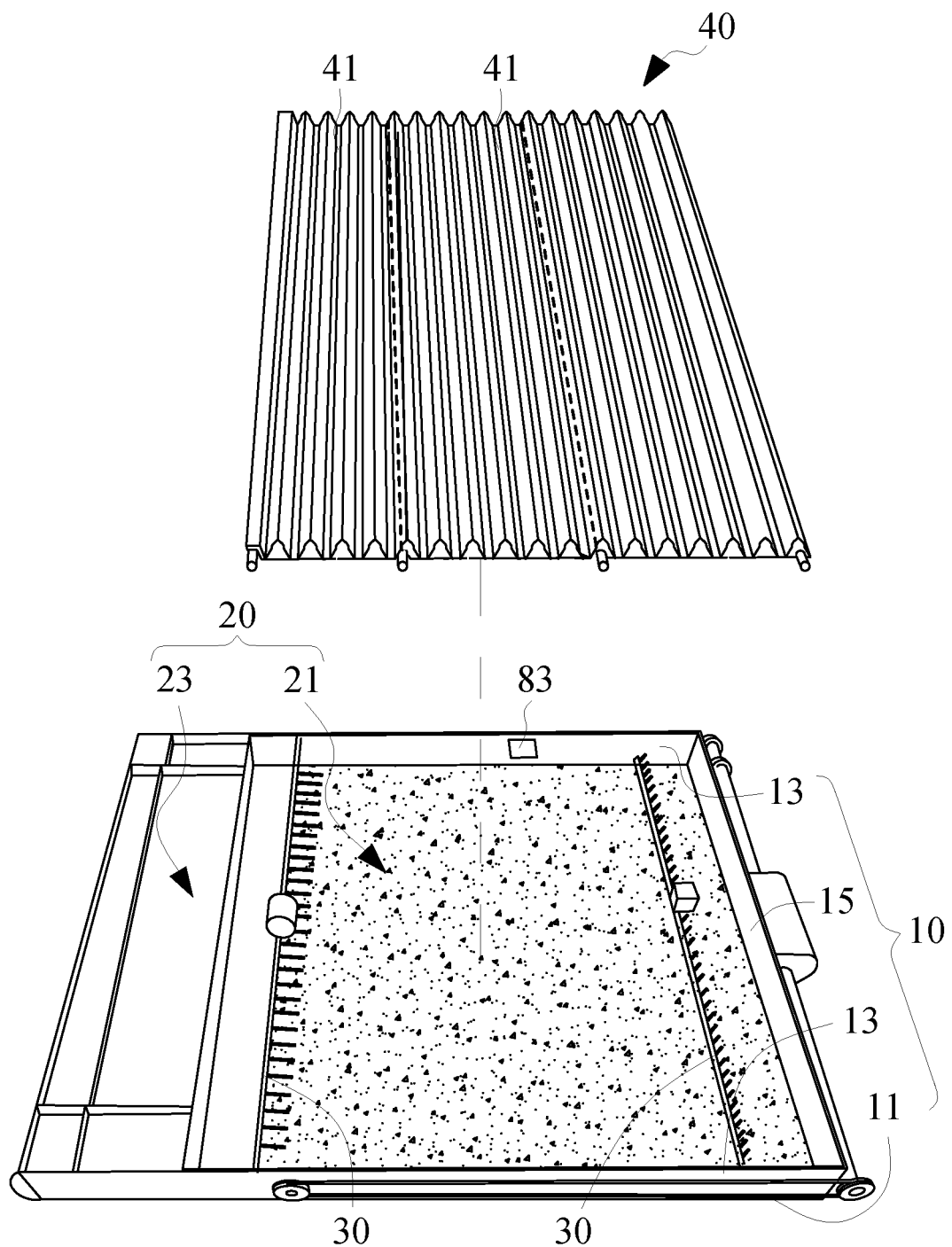
FIG. 1 is a partial exploded view of an excrement collection device according to an embodiment of the present disclosure.
Figure 2:
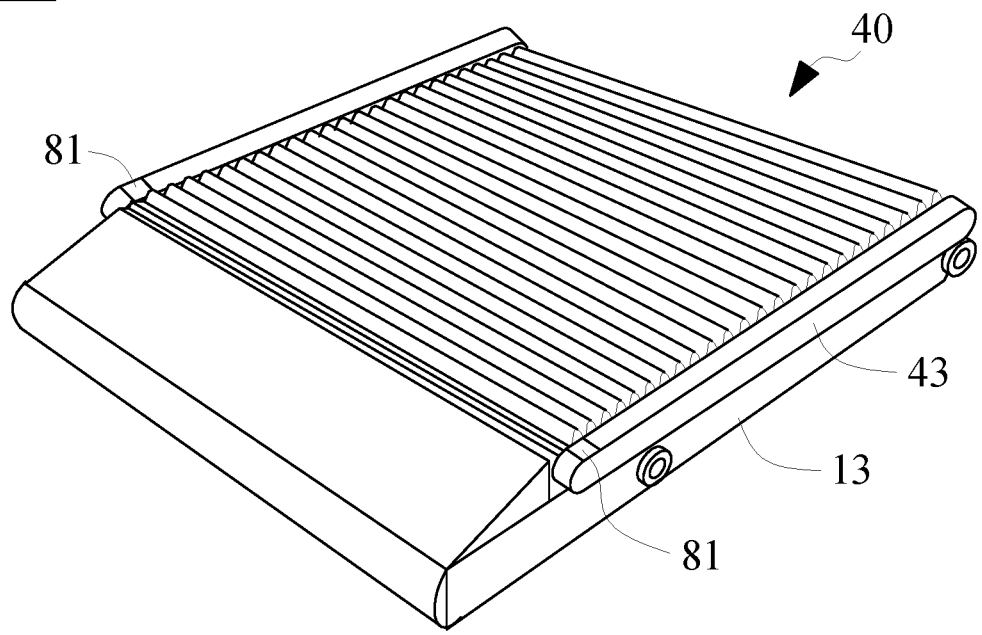
FIG. 2 is a perspective view of the excrement collection device according to an embodiment of the present disclosure.

FIG. 1 is a partial exploded view of an excrement collection device 100 according to an embodiment of the present disclosure. FIG. 2 is a perspective view of the excrement collection device 100 according to an embodiment of the present disclosure. For the sake of illustration of the excrement collection device 100, both FIG. 1 and FIG. 2 leaves out some components. Furthermore, the excrement collection device 100 is useful to people who keep pets, such as dogs and cats, and allow the pets to defecate and urinate at home.

As shown in FIG. 1, the excrement collection device 100 comprises a casing 10, a receiving space 20, a cleansing component 30 and a support component 40. The casing 10 comprises a bottom wall 11, two opposing first outer sidewalls 13, and a second outer sidewall 15 for connecting the first outer sidewalls 13. The receiving space 20 is defined by the bottom wall 11, the first outer sidewalls 13, and the second outer sidewall 15. The receiving space 20 is divided into a temporary storage region 21 and a collection region 23. The temporary storage region 21 is defined between the second outer sidewall 15 and the collection region 23. The cleansing component 30 is disposed in the temporary storage region 21. The support component 40 is disposed at the top of the temporary storage region 21. The support component 40 comprises a plurality of rotatable support boards 41.

In this embodiment, pets defecate and urinate on the support component 40. Upon completion of the pets' defecation and urination, the rotatable support boards 41 rotate automatically to allow excrement to fall into the temporary storage region 21 of the receiving space 20. Afterward, the excrement in the temporary storage region 21 is delivered by the cleansing component 30 automatically to the collection region 23 and gathered therein. Hence, with the excrement collection device 100 in an embodiment of the present disclosure, upon completion of the pets' defecation and urination at home, the excrement is gathered in the collection region 23, thereby sparing the pet keepers from the hassles of cleansing, not to mention that the excrement is not exposure to air for so long as to be foul-smelling. Even if the pet keepers allow their pets to stay at home while they are working overtime, traveling on business, or travelling on vacation, the excrement collection device 100 will keep operating. The excrement collection device is described in detail below, according to different embodiments of the present disclosure.

Figure 3:
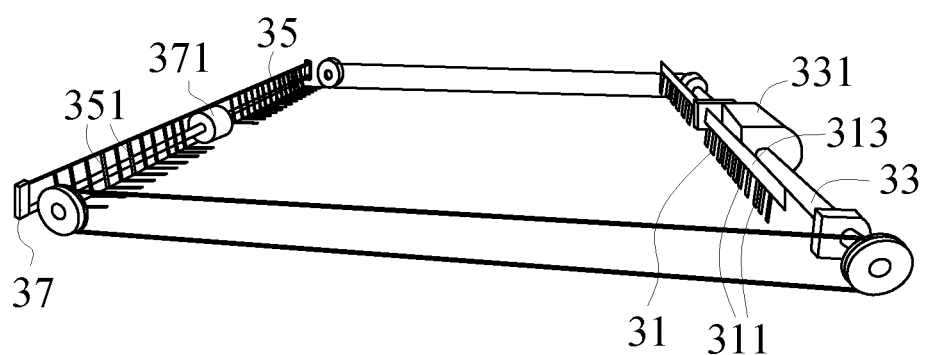
FIG. 3 is a schematic view of a cleansing component according to an embodiment of the present disclosure.

FIG. 3 is a schematic view of a cleansing component 30 according to an embodiment of the present disclosure. As shown in FIG. 3, the cleansing component 30 comprises a push harrow 31, a push rod 33, a rotation harrow 35, and a rotation rod 37. The push harrow 31 has a plurality of blades 311. The push rod 33 carries the push harrow 31 and pushes the push harrow 31 such that the push harrow 31 moves within the temporary storage region 21 along a specific route. Referring to FIG. 1 and FIG. 3, in this embodiment, the rotation harrow 35 is disposed at the junction of the temporary storage region 21 and the collection region 23. The rotation harrow 35 has a plurality of L-shaped grates 351. The rotation rod 37 carries the rotation harrow 35 and rotates the rotation harrow 35.

For instance, cleansing sand (for example, cat litters) is placed in the temporary storage region 21 of the receiving space 20. After the pets (for example, dogs and cats) have defecated and urinated on the support component 40 and then left the support component 40, the rotatable support boards 41 rotate automatically, that is, change from a horizontal state to an oblique or vertical state, such that the excrement passes through the gaps between the rotatable support boards 41 to therefore fall into the temporary storage region 21. After the excrement has fallen into the temporary storage region 21, the rotatable support boards 41 rotate automatically once again to therefore change from the oblique or vertical state to the horizontal state. Afterward, the push rod 33 carrying the push harrow 31 pushes the push harrow 31 and causes the push harrow 31 to move within the temporary storage region 21 in a direction parallel to the first outer sidewalls 13. At this point in time, the push harrow 31 enables solid excrement, such as feces, to be enclosed by cleansing sand, whereas the blades 311 push the solid excrement to the rotation harrow 35 at the junction of the temporary storage region 21 and the collection region 23. Then, the push harrow 31 moves backward along the pushing route to thereby return to the initial position thereof. Therefore, the solid excrement enclosed by the cleansing sand has been pushed by the push harrow 31 to the junction of the temporary storage region 21 and the collection region 23.

As soon as the rotatable support boards 41 rotate and change from the horizontal state to the oblique or vertical state once again, the rotation rod 37 carrying the rotation harrow 35 rotates the rotation harrow 35 such that the rotation harrow 35 delivers the solid excrement to the collection region 23 through the L-shaped grates 351. Afterward, the rotation harrow 35 rotates backward along the delivery route to therefore return to the initial position thereof. After the rotation harrow 35 has returned to the initial position thereof, the rotatable support boards 41 rotate automatically once again to therefore change from the oblique or vertical state to the horizontal state, so as to be available to the pets once again.

In an embodiment, the push rod 33 carrying the push harrow 31 is, for example, driven by a belt or gear powered by a motor 331 in order to push the push harrow 31, but the present disclosure is not limited thereto. Instead, the position of the motor 331 and a component for driving the push rod 33 to move are subject to changes as needed. Furthermore, the rotation rod 37 carrying the rotation harrow 35 is, for example, driven by a belt or gear powered by a motor 371 in order to rotate the rotation harrow 35. Likewise, the present disclosure is not limited thereto. Instead, the position of the motor 371 and a component for driving the rotation rod 37 to rotate are subject to changes as needed. For instance, the motor 371 is, for example, disposed on one side, rather than the middle, of the rotation rod 37.

To prevent the rotatable support boards 41, which lie above the rotation harrow 35 and are oblique or vertical, from interfering with the rotation harrow 35 in the course of rotation thereof, there are limitations on the length of the L-shaped grates 351 to the detriment of the ease of delivery of the solid excrement. Hence, in some other embodiments, the ends of the L-shaped grates 351 are made of bendable plastics such that the length of the L-shaped grates 351 is constant, not to mention that the rotation harrow 35 is free from interference from the rotatable support boards 41 above the rotation harrow 35.

In an embodiment, the top surface (underpinning the cleansing sand) of the bottom wall 11 is, for example, a slope. The slope tilts downward from the junction of the temporary storage region 21 and the collection region 23 toward the second outer sidewall 15. As soon as the blades 311 of the push harrow 31 push the solid excrement toward the junction of the temporary storage region 21 and the collection region 23, the slope causes the cleansing sand to pass through the gaps between the blades 311 and spontaneously slide toward the second outer sidewall 15; hence, the cleansing sand is not gathered at the junction of the temporary storage region 21 and the collection region 23 despite the push of the solid excrement.

Likewise, to further prevent the cleansing sand from being gathered at the junction of the temporary storage region 21 and the collection region 23, the push harrow 31 in some other embodiments further has a sand plate 313. The sand plate 313 is disposed at the top of the blades 311 and movable to the bottom of the blades 311. The sand plate 313 stays at the top of the blades 311 while the blades 311 of the push harrow 31 are pushing the solid excrement enclosed in the cleansing sand to the rotation harrow 35 at the junction of the temporary storage region 21 and the collection region 23. By the time the pushing process terminates, the sand plate 313 has been moved to the bottom of the blades 311 and beyond the ends of the blades 311. The sand plate 313 flattens the cleansing sand gathered at the junction of the temporary storage region 21 and the collection region 23 during the preceding pushing process, while the push harrow 31 is moving backward along the push route to return to the initial position thereof.

Figure 4A:
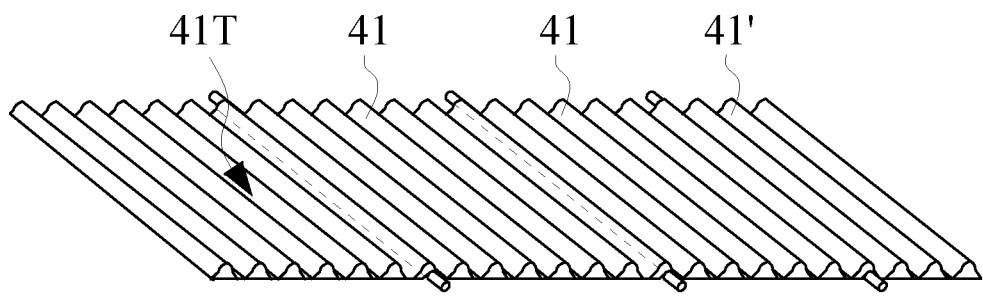
FIG. 4A is a schematic view of horizontally-arranged rotatable support boards of a support component according to an embodiment of the present disclosure.
Figure 4B:
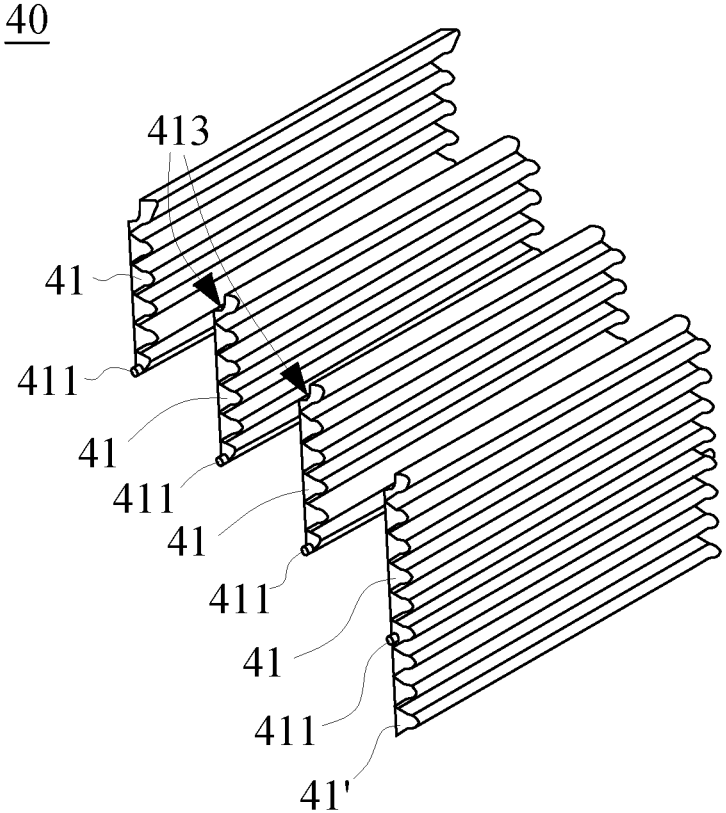
FIG. 4B is a schematic view of vertically-arranged rotatable support boards of the support component according to an embodiment of the present disclosure.

FIG. 4A is a schematic view of horizontally-arranged rotatable support boards 41 of a support component 40 according to an embodiment of the present disclosure. FIG. 4B is a schematic view of vertically-arranged rotatable support boards 41 of the support component 40 according to an embodiment of the present disclosure. Although the rotatable support boards 41 shown in FIG. 4B are in the vertical state, the present disclosure is not limited thereto. In some other embodiments, the rotatable support boards 41 are in the oblique state to reduce the distance between the rotatable support boards 41 and the bottom wall 11 of the casing 10 and thus further reduce the volume of the excrement collection device 100. The excrement collection device 100 of the present disclosure will work, provided that the excrement collection device 100 enables the solid excrement to fall into the temporary storage region 21.

As shown in FIG. 4A and FIG. 4B, the rotatable support boards 41 each comprise a rotating shaft 411 and an engaging slot 413. The rotating shaft 411 is disposed on a long side of each rotatable support board 41 to rotate the rotatable support board 41. The engaging slot 413 is disposed on another long side of each rotatable support board 41 to engage with the rotating shaft 411 of an adjacent one of the rotatable support boards 41. Hence, when the rotatable support boards 41 are arranged horizontally, adjacent ones of the rotatable support boards 41 overlap and thus augment the mechanical strength and supporting forces of the rotatable support boards 41.

Figure 4C:
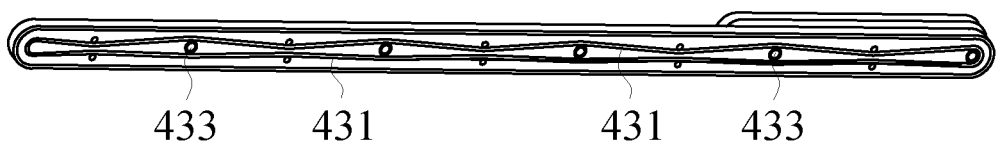
FIG. 4C is a schematic view of a rotation control element according to an embodiment of the present disclosure.

In this embodiment, the support component 40 further comprises a rotation control element 43. The rotation control element 43 controls and rotates the rotatable support boards 41. FIG. 4C is a schematic view of a rotation control element 43 according to an embodiment of the present disclosure. Referring to FIG. 2, FIG. 4A through FIG. 4C, the rotation control element 43 is disposed on at least one of the first outer sidewalls 13 to therefore rotate the rotating shafts 411 of the rotatable support boards 41 simultaneously. For instance, with a belt 431 and a gear 433 which are driven by a motor (not shown), the rotation control element 43 rotates the rotating shafts 411 of the rotatable support boards 41 simultaneously, and thus the rotatable support boards 41 rotate simultaneously. However, the present disclosure is not limited thereto. All means of rotating the rotating shafts 411 of the rotatable support boards 41 are applicable to the present disclosure.

Referring to FIG. 1, FIG. 4A and FIG. 4B, in an embodiment, the top of each rotatable support board 41 has a plurality of troughs 41T. The troughs 41T each extend along two long sides of a corresponding one of the rotatable support boards such that the pets' urine (liquid excrement) is drained out of the support component 40 through the troughs 41T. For instance, the troughs 41T are each parallel to two long sides of a corresponding one of the rotatable support boards (parallel to the second outer sidewall 15 in this embodiment). However, the present disclosure is not limited thereto. In some other embodiments, the two long sides of each rotatable support board and each trough 41T are curved as needed. Hence, the troughs 41T are for use in draining the pets' urine (liquid excrement) to a specific position and effectively preventing the pets defecating and urinating on the support component 40 from having their feet wetted by the urine.

For instance, in an embodiment, the depth of the troughs 41T increases gradually from the center of each rotatable support board 41 toward two ends thereof. Therefore, after the pets' urine has entered the troughs 41T, the urine is drained to the two ends of each rotatable support board 41. In another embodiment, the depth of the troughs 41T increases gradually from one end of each rotatable support board 41 to the other end thereof. Therefore, after the pets' urine has entered the troughs 41T, the urine is drained to the other end of each rotatable support board 41 (because the troughs 41T are deeper).

As mentioned before, the troughs 41T vary in depth to therefore drain the pets' urine efficiently. In some other embodiments, the troughs 41T have the same depth, and the rotatable support boards 41 are oblique, so as to drain the pets' urine. The description below is exemplified by the requirement that the depth of the troughs 41T increases gradually from the center of each rotatable support board 41 to two ends thereof, but the present disclosure is not limited thereto.

Figure 5:
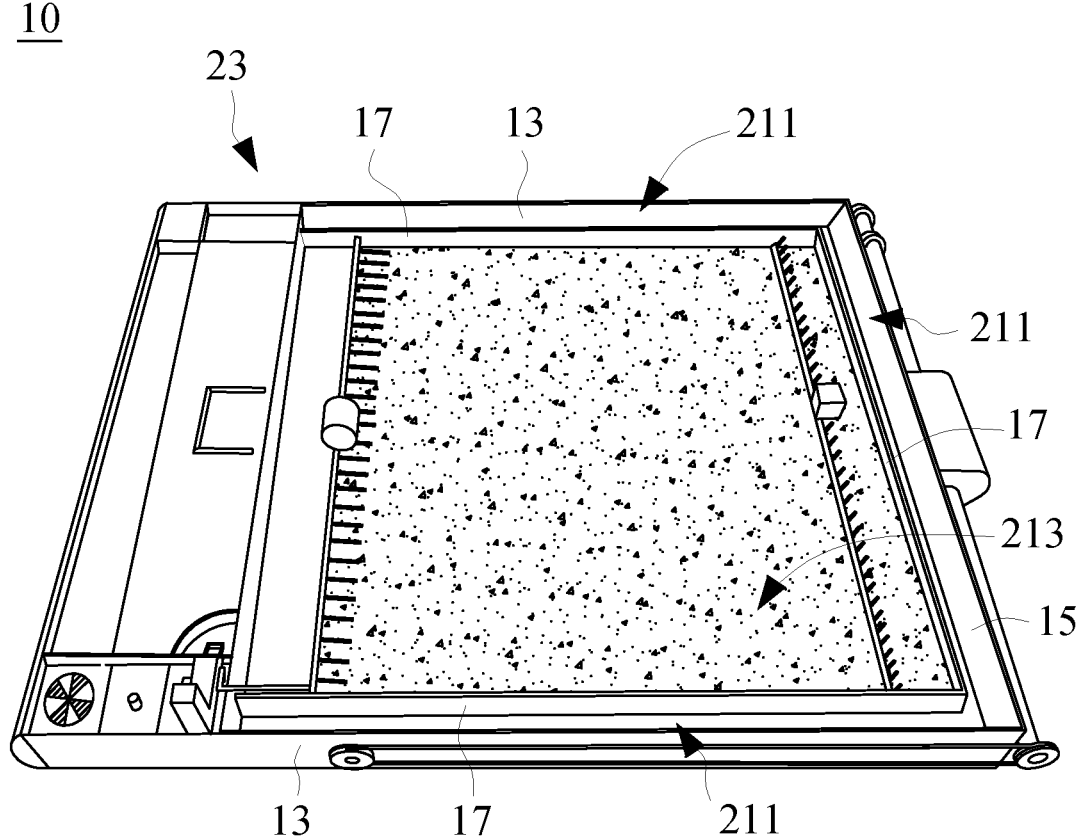
FIG. 5 is a partial schematic view of a casing according to an embodiment of the present disclosure.

FIG. 5 is a partial schematic view of a casing 10 according to an embodiment of the present disclosure. In this embodiment, the casing 10 further comprises a urine drainage channel 211 for draining urine from the troughs 41T to the collection region 23. As shown in FIG. 5, the casing 10 further comprises three inner sidewalls 17. Two of the inner sidewalls 17 are parallel to the first outer sidewalls 13. The remaining one of the inner sidewalls 17 is parallel to the second outer sidewall 15. The inner sidewalls 17 divide the temporary storage region 21 into the urine drainage channel 211 and a feces temporary storage zone 213. In an embodiment of the present disclosure, the feces temporary storage zone 213 is separate from the urine drainage channel 211, whereas both the push harrow 31 and the rotation harrow 35 of the cleansing component 30 are disposed in the feces temporary storage zone 213. Therefore, the pets' feces (solid excrement) and urine (liquid excrement) in the temporary storage region 21 are separated before being collected at different positions in the collection region 23 and processed, respectively (to be discussed later).

Unlike conventional excrement collection devices, the excrement collection device in an embodiment of the present disclosure requires that the pets' feces (solid excrement) and urine (liquid excrement) be mixed and processed. The excrement collection device 100 in an embodiment of the present disclosure automatically separates and processes the pets' feces (solid excrement) and urine (liquid excrement) to therefore further enhance the efficiency of deodorization and prevent home/indoor environment quality deterioration otherwise caused by the foul-smelling excrement of the pets.

Although in the aforesaid embodiment of the present disclosure the inner sidewalls 17 divide the temporary storage region 21 into the urine drainage channel 211 and the feces temporary storage zone 213, the present disclosure is not limited thereto. In another embodiment of the present disclosure, the urine drainage channel 211 is connected to the support component 40 from below. Therefore, the urine drainage channel 211 is directly disposed at the urine-related exit of the troughs 41T and connected to the support component 40 from below, allowing the pets' urine to be drained to the collection region 23. Unlike the aforesaid embodiment in which the urine drainage channel 211 is defined by the inner sidewalls 17, this embodiment is characterized in that the urine drainage channel 211 enables further a reduction in the distance traveled by the urine from the troughs 41T to the urine drainage channel 211 and a decrease in urine splashing. Furthermore, the urine drainage channel 211 need not correspond in position to the first outer sidewalls 13 and the second outer sidewall 15 as shown in FIG. 5. For instance, in some other embodiments, the urine drainage channel 211 corresponds in position to just one of the first outer sidewalls 13, depending on the arrangement of the troughs 41T of the rotatable support boards 41 and the collection region 23.

In an embodiment, the troughs 41T and the urine drainage channel 211 have at least one of a hydrophobic coating and a photocatalyst coating. The hydrophobic coating prevents urine from wetting the troughs 41T and the urine drainage channel 211 and thus precludes a foul-smelling odor. The photocatalyst coating is, for example, titanium dioxide coating, and is capable of decomposing organic matter in the urine to further preclude a foul-smelling odor.

Figure 6:
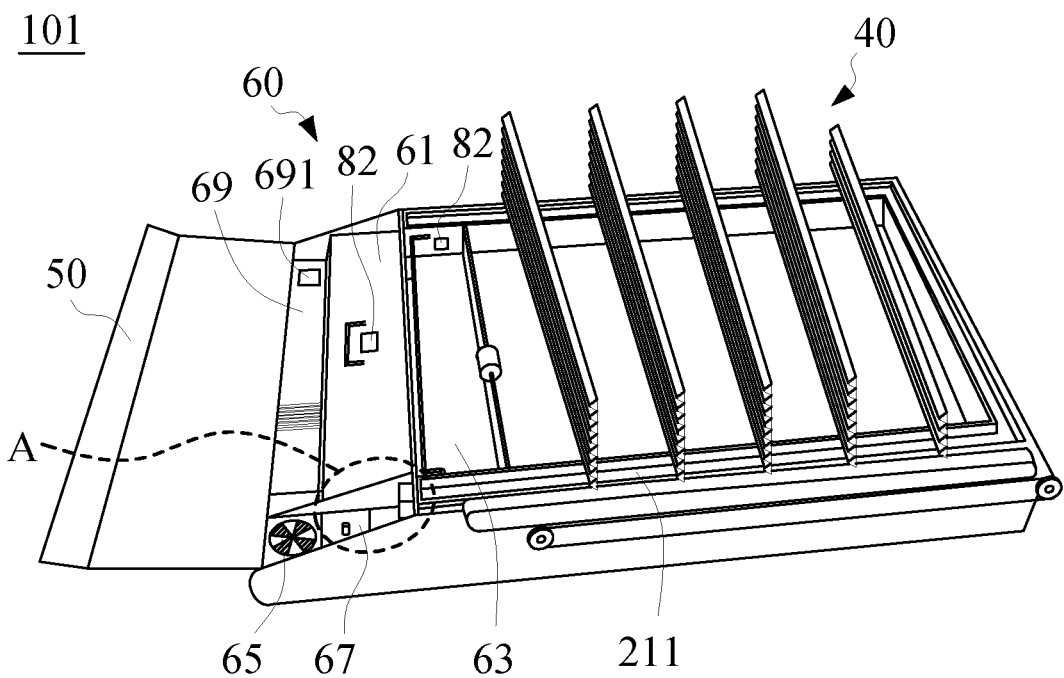
FIG. 6 is a schematic view of another excrement collection device according to another embodiment of the present disclosure.

FIG. 6 is a schematic view of an excrement collection device 101 according to another embodiment of the present disclosure. Likewise, to depict the excrement collection device 101 clearly, FIG. 6 leaves out some components. Furthermore, the excrement collection device 101 shown in FIG. 6 is similar to the excrement collection device 100 shown in FIG. 1 through FIG. 5 in terms of structures and components such that the structures and components are denoted by identical reference numerals and reference signs, sparing repeated description.

Referring to FIG. 6, in this embodiment, the excrement collection device 101 further comprises a ramp 50 and a collection box 60. The ramp 50 is separably disposed at the top of the collection region 23. The collection box 60 is disposed in the collection region 23. To depict the collection box 60 clearly, FIG. 6 shows the ramp 50 in a lifted manner. The ramp 50 facilitates the pets' entry into the support component 40 for defecation and urination. In some other embodiments, a footrest which can be changed and washed is disposed on the ramp 50. If the pets wet their feet in the course of defecation and urination, the footrest will absorb the feces and urine otherwise adhered to the pets' feet. The collection box 60 collects and stores the pets' excrement. The collection box 60 comprises a urine collection component 61 and a feces collection component 63.

For instance, the urine drainage channel 211 drains the pets' urine to the urine collection component 61, whereas the cleansing component 30 pushes and delivers feces from the temporary storage region 21 (or the feces temporary storage zone 213) to the feces collection component 63. Therefore, after being separated in the temporary storage region 21, the pets' feces (solid excrement) and urine (liquid excrement) is collected in the feces collection component 63 and the urine collection component 61 of the collection box 60, respectively.

In this embodiment, the ramp 50 is demountably disposed on the top of the collection region 23, whereas the urine collection component 61 and the feces collection component 63 can be taken (withdrawn) out of the collection box 60. After a specific amount of the pets' feces (solid excrement) and/or urine (liquid excrement) has been collected in the collection box 60, the pet keepers may remove the ramp 50 from the top of the collection region 23 or lift the ramp 50, and withdrawn the urine collection component 61 and/or the feces collection component 63 from the collection box 60, so as to dump the excrement in a toilet or any other appropriate place for disposal.

As shown in FIG. 6, in an embodiment, the collection box 60 further comprises an odor processing component 65. The odor processing component 65 is in communication with at least one of the feces collection component 63 and the urine collection component 61. For instance, the odor processing component 65 comprises activated charcoal filter to serve as a mini air filtering system (air purifier) and communicate with at least one of the feces collection component 63 and the urine collection component 61. The odor processing component 65 absorbs air in the feces collection component 63 and the urine collection component 61 before processing and discharging the air. Alternatively, the feces collected in the feces collection component 63 is further dried and deodorized. In an embodiment, the odor processing component 65 is also in communication with the temporary storage region 21 (the feces temporary storage zone 213).

Figure 7:
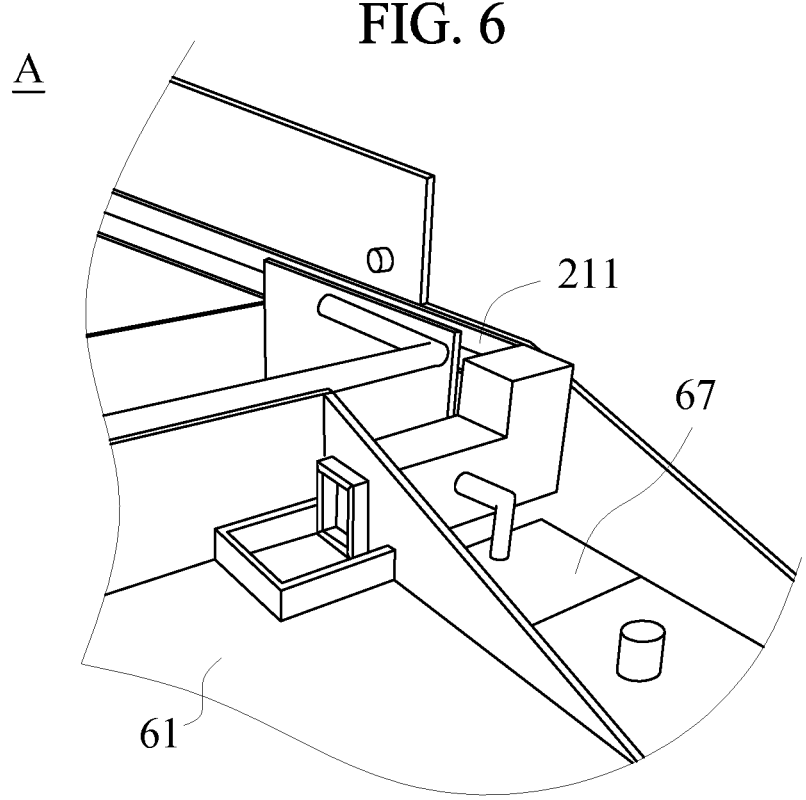
FIG. 7 is a schematic view of region A of FIG. 6 from another angle.

FIG. 7 is a schematic view of region A of FIG. 6 from another angle. As shown in FIG. 7, in this embodiment, the collection box 60 further comprises a urine processing component 67. The urine processing component 67 is in communication with the urine collection component 61. For instance, the urine processing component 67 is connected to the end of the urine drainage channel 211 and can automatically discharge (feed) a specific liquid; hence, the specific liquid and the urine drained by the urine drainage channel 211 together flow into the urine collection component 61. In an embodiment, the specific liquid discharged from the urine processing component 67 is effectively deodorized and sterilized.

For the sake of illustration, both the activated charcoal filter in the odor processing component 65 and the specific liquid in the urine processing component 67 are consumables. After these consumables have weakened or run out, the pet keepers can remove them from the collection box 60 through the component so as to replace or supplement them.

Figure 8:
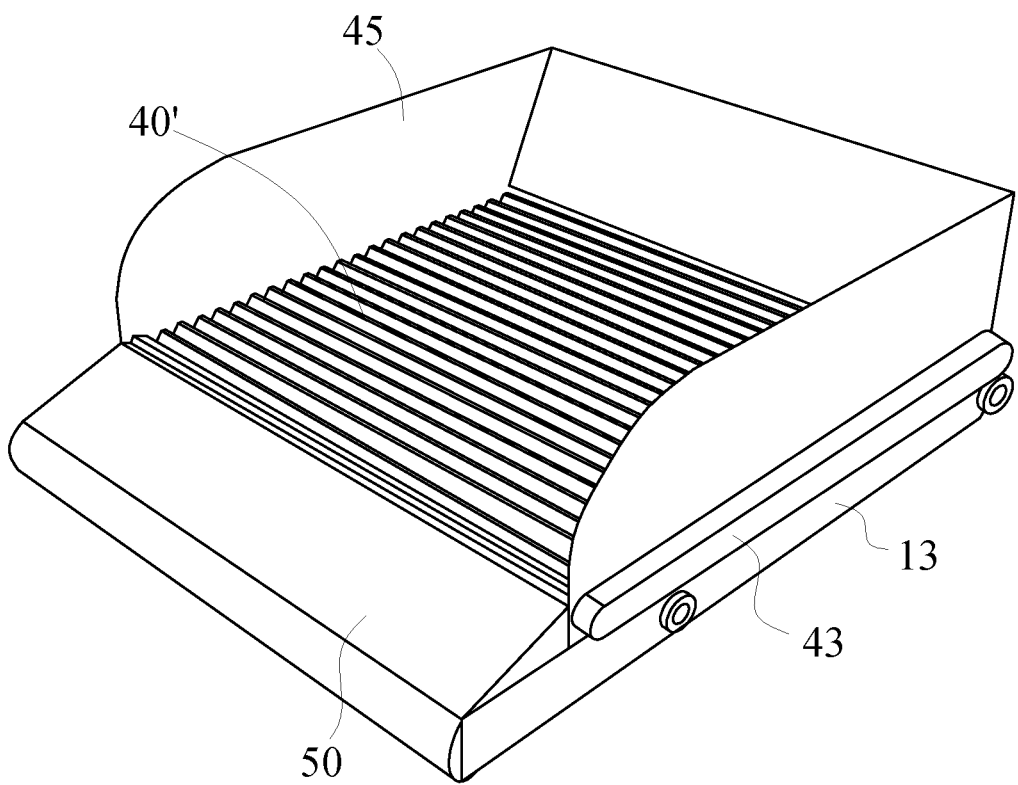
FIG. 8 is a partial exploded view of yet another excrement collection device according to yet another embodiment of the present disclosure.

FIG. 8 is a partial exploded view of an excrement collection device 102 according to yet another embodiment of the present disclosure. Likewise, to depict the excrement collection device 102 clearly, FIG. 8 leaves out some components. Furthermore, the excrement collection device 102 shown in FIG. 8 is similar to the excrement collection devices 100, 101 shown in FIG. 1 through FIG. 7 in terms of structures and components such that the structures and components are denoted by identical reference numerals and reference signs, sparing repeated description.

As shown in FIG. 8, in the excrement collection device 102, the support component 40 further comprises a fence 45. The fence 45 is demountably disposed on the casing 10 and corresponds in position to the first outer sidewalls 13 and the second outer sidewall 15. The fence 45 not only allows a male pet, for example, a dog, to raise his leg in order to pee, but also prevents his urine from going out of the excrement collection device 102.

In an embodiment, the fence 45 has at least one of a hydrophobic coating and a photocatalyst coating. The hydrophobic coating prevents the urine from wetting the fence 45 and precludes a foul-smelling odor. The photocatalyst coating is, for example, titanium dioxide coating, and is capable of decomposing organic matter in the urine to further preclude a foul-smelling odor.

In some other embodiments, the fence 45 is equipped with an LED lamp for indicating the status of operation of the excrement collection device 102. For instance, if the rotatable support boards 41 of the support component 40 are not horizontal, the fence 45 will, for example, emit light continuously or intermittently to give an alert. In response to the alert, the pets will refrain from approaching the excrement collection device 102. It is only when the rotatable support boards 41 restore their horizontal state that the alert terminates. Hence, the pets will be admitted to the excrement collection device 102 to defecate and urinate, only if the admittance is risk-free. Alternatively, after a specific amount of the pets' feces (solid excrement) and/or urine (liquid excrement) has been collected in the collection box 60, the fence 45 uses the LED lamp to urge the pet keepers to handle the pets' feces (solid excrement) and/or urine (liquid excrement).

Figure 9A:
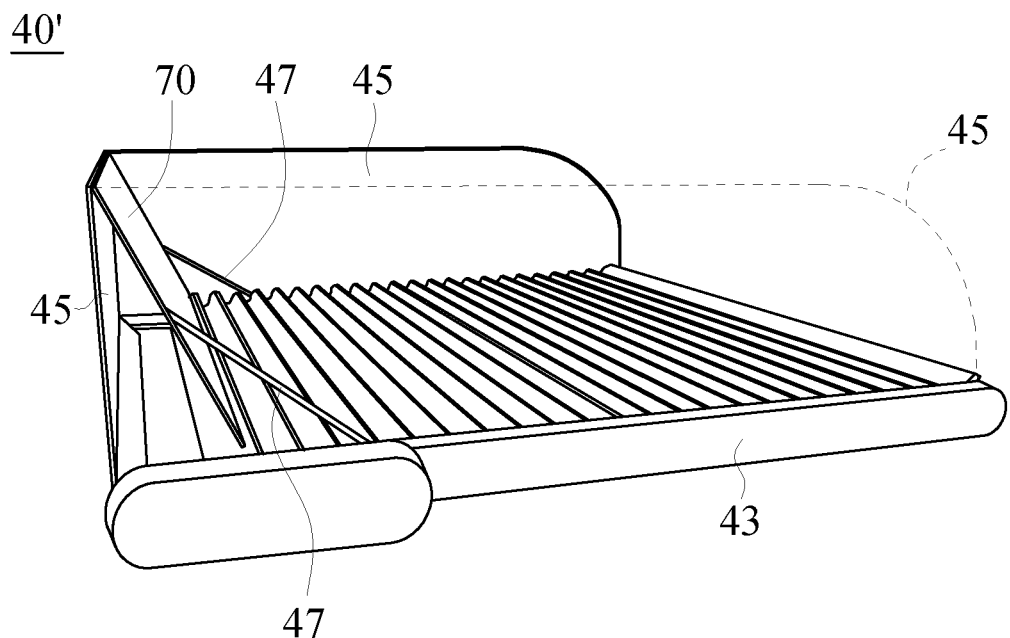
FIG. 9A is a schematic view of horizontally-arranged rotatable support boards of the support component according to an embodiment of the present disclosure.
Figure 9B:
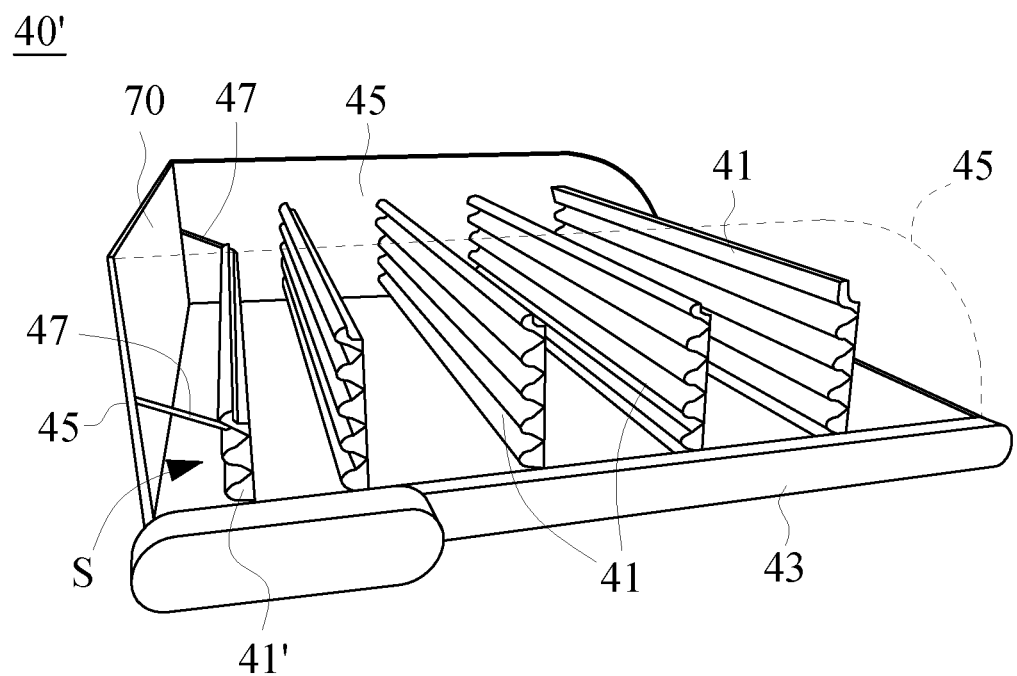
FIG. 9B is a schematic view of vertically-arranged rotatable support boards of the support component according to an embodiment of the present disclosure.

FIG. 9A is a schematic view of horizontally-arranged rotatable support boards 41 of the support component 40' according to an embodiment of the present disclosure. FIG. 9B is a schematic view of vertically-arranged rotatable support boards 41 of the support component 40' according to an embodiment of the present disclosure. Likewise, although the rotatable support boards 41 shown in FIG. 9B are in the vertical state, the present disclosure is not limited thereto. In some other embodiments, the rotatable support boards 41 are in the oblique state. Hence, the excrement collection device 102 of the present disclosure will work, provided that the excrement collection device 102 enables the solid excrement to fall into the temporary storage region 21.

In this embodiment, a slit S is disposed between the rotatable support board 41' closest to the second outer sidewall 15 and the second outer sidewall 15. The excrement collection device 102 further comprises a shield 70. The shield 70 extends from the fence 45 on the second outer sidewall 15. The shield 70 is connected to the rotatable support board 41 closest to the second outer sidewall 15 by a cord 47. As shown in FIG. 9A, as soon as the rotatable support boards 41 are laid flat, the shield 70 hides the slit S. As shown in FIG. 9B, when the rotatable support boards 41 are vertical (or oblique), the slit S is exposed, allowing the pets' excrement to fall into the temporary storage region 21.

However, the present disclosure is not limited thereto. In some embodiments (as shown in FIG. 4A, FIG. 4B, for example), the same rotating shaft 411 is shared by the rotatable support board 41' closest to the second outer sidewall 15 and an adjacent one of rotatable support boards 41. Therefore, the rotatable support board 41' closest to the second outer sidewall 15 is adjacent to the second outer sidewall 15, indicating the absence of the slit S therebetween and thus dispensing with the shield 70. Furthermore, the aforesaid embodiment works well, whether the support component 40 comprises the fence 45 or not.

Furthermore, in an embodiment of the present disclosure, each rotatable support board 41 turns about the other rotating shaft 411 thereof in order to be lifted such that the urine drainage channel 211 below is unlikely to be affected by the rotatable support board 41 in the oblique or vertical state.

However, in the embodiment illustrated by FIG. 4A and FIG. 4B, with the same rotating shaft 411 being shared by the rotatable support board 41' closest to the second outer sidewall 15 and an adjacent one of the rotatable support boards 41, the rotatable support board 41' closest to the second outer sidewall 15 rotates downward, whenever the rotatable support boards 41 are in the oblique or vertical state. To prevent the urine drainage channel 211 below from being affected, the rotatable support boards 41' are slightly shorter and narrower than the other rotatable support boards 41 (and are not shown in FIG. 4A and FIG. 4B).

In this embodiment, to ensure that the urine will be smoothly drained to the urine drainage channel 211 and thus will directly fall into the feces temporary storage zone 213 despite the gaps resulting from the shorter rotatable support boards 41', special urine drain troughs (not shown) are disposed on the rotatable support boards 41' such that the urine is drained from the rotatable support boards 41' to the adjacent rotatable support boards 41 (sharing the same rotating shaft 411) and then drained to the urine drainage channel 211. With the support component 40 comprising the fence 45, the rotatable support board 41' closest to the second outer sidewall 15 is surrounded by a forward-flow protruding plate (not shown). The forward-flow protruding plate hides the gaps resulting from the shorter, narrower rotatable support boards 41' such that the pets' urine can fall into the rotatable support boards 41' smoothly before being drained by the special urine drain troughs to the adjacent rotatable support boards 41 and then to the urine drainage channel 211. But the present disclosure is not limited thereto. Instead, the disclosure contained in the aforesaid embodiment is subject to changes as needed in accordance with the other components in the excrement collection device 100 (101, 102).

In an embodiment, the support component 40 (support component 40') is separably disposed on the top of the temporary storage region 21. For instance, to replace the cleansing sand in the temporary storage region 21 or cleanse the temporary storage region 21, the pet keepers separate (for example, lift) the support component 40 (support component 40') from the casing 10. In some other embodiments, a temporary storage box (not shown) is disposed in the temporary storage region 21, and the cleansing sand is placed in the temporary storage box. To perform replacement or cleansing, the pet keepers separate the support component 40 (support component 40') from the casing 10 and remove the temporary storage box, conveniently.

Figure 10A:
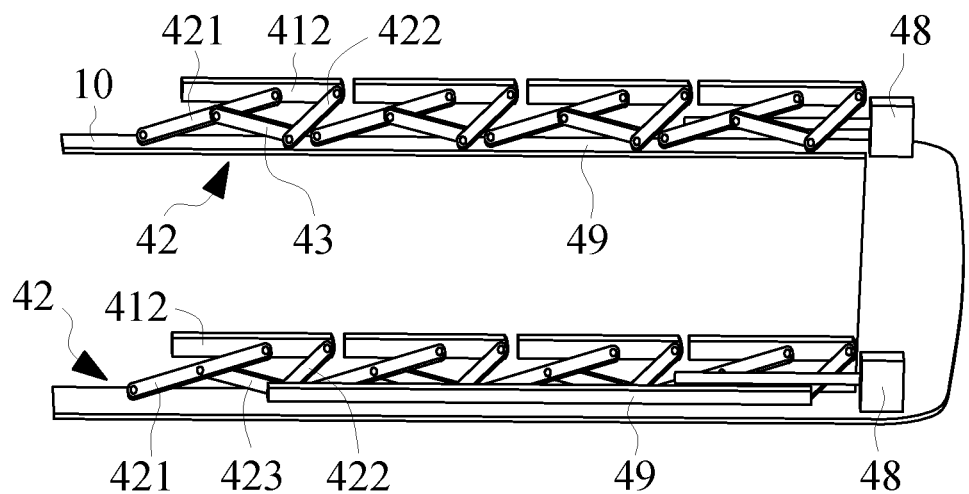
FIG. 10A is a schematic view of a support component comprising two linkages, two power sources and two driving elements according to an embodiment of the present disclosure.
Figure 10B:
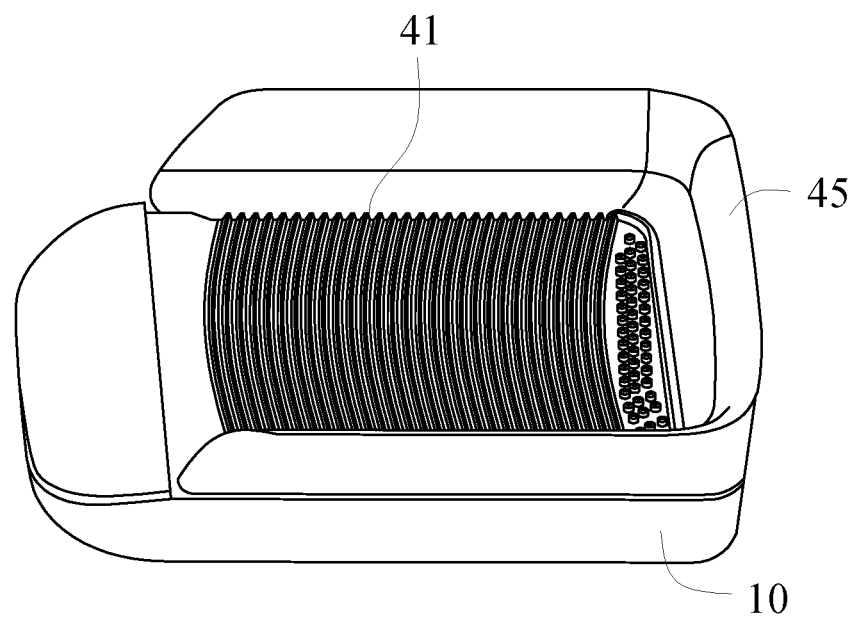
FIG. 10B is a schematic view of the support component whose rotatable support boards are lying according to an embodiment of the present disclosure.
Figure 11A:
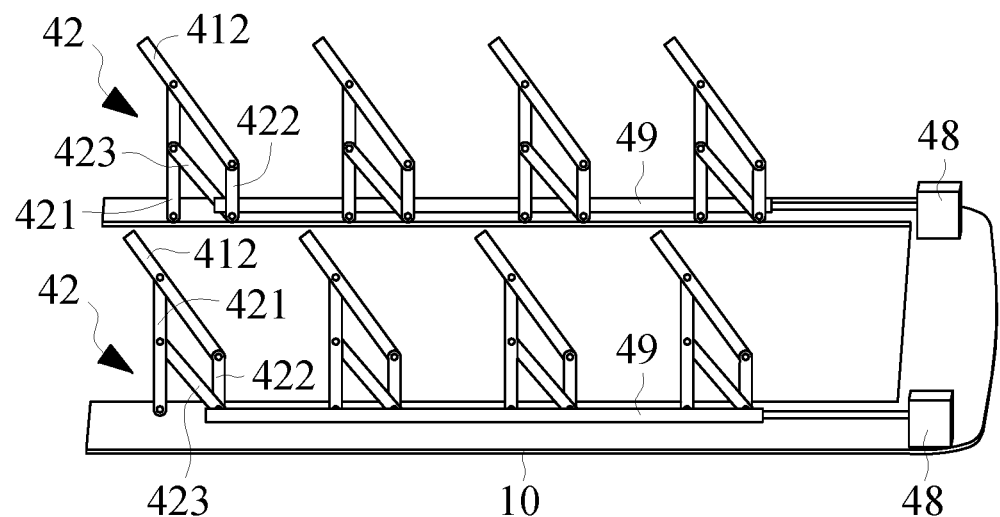
FIG. 11A is a schematic view of the support component comprising two linkages, two power sources and two driving elements according to an embodiment of the present disclosure.
Figure 11B:
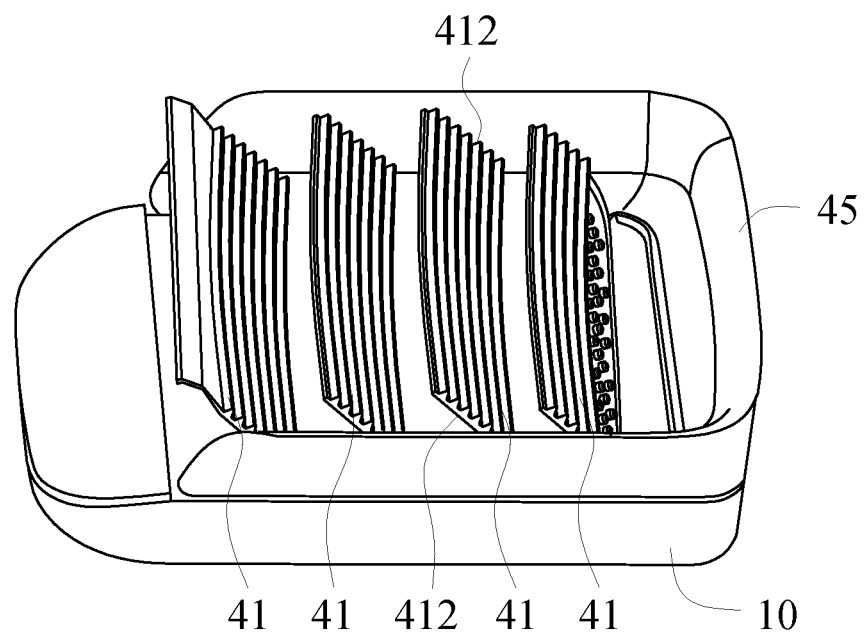
FIG. 11B is a schematic view of the support component whose rotatable support boards tilt according to an embodiment of the present disclosure.
Figure 12:
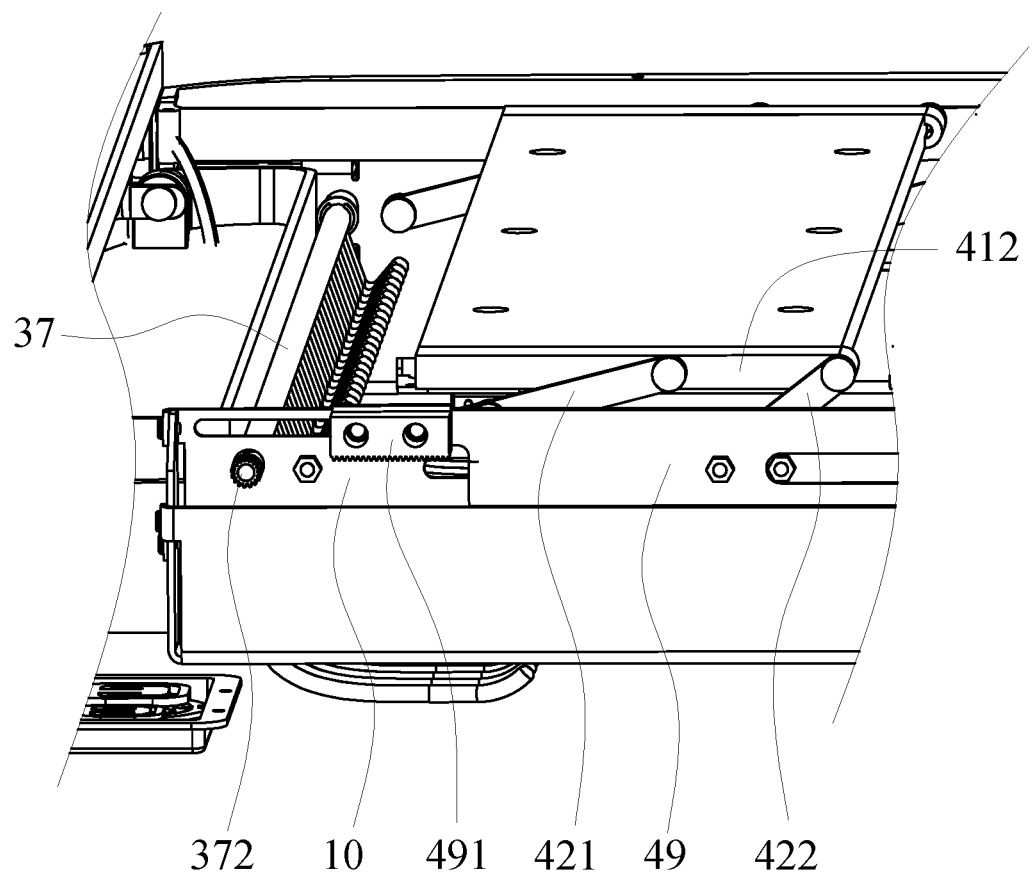
FIG. 12 is a schematic view of a rotation gear and a forwarding rack according to an embodiment of the present disclosure.

Referring to FIG. 10A through FIG. 11B, in an embodiment, the support component 40 further comprises a plurality of linkages 42, at least a power source 48 and at least a driving element 49. For the sake of illustration of the operation of the linkages 42, FIG. 10A and FIG. 11A show only two short edges 412 of the rotatable support boards 41 but do not show the bodies of the rotatable support boards 41. When the power source 48 and the driving element 49 are each provided in the number of one, the power source 48 is connected to the driving element 49, such that the power source 48 is a motor with a screw, whereas the driving element 49 is a long rod with a rack. The screw of the motor meshes with the rack of the long rod such that the driving element 49 undergoes reciprocating motion on the casing 10 horizontally. The linkages 42 are disposed at two short edges 412 of each rotatable support board 41. The linkages 42 each comprise a long rod 421, a short rod 422 and a connecting rod 423. One end of the long rod 421 and one end of the short rod 422 are pivotally connected to the short edges 412 of each rotatable support board 41. The other end of the long rod 421 is pivotally connected to the casing 10. The other end of the short rod 422 is pivotally connected to the driving element 49. One end of the connecting rod 423 is pivotally connected between two ends of the long rod 421. The other end of the connecting rod 423 is pivotally connected to the other end of the short rod 422. While the support component 40 is operating, the power source 48 drives the driving element 49 to undergo reciprocating motion on the casing 10 horizontally, whereas the driving element 49 drives the other ends of the connecting rods 423 on one side of the rotatable support boards 41 and the other ends of the short rods 422 to undergo reciprocating motion horizontally; hence, the rotatable support boards 41 drive the linkages 42 on the other side to operate, thereby causing the rotatable support boards 41 to change their posture from lying to tilting (for example, FIG. 10A is replaced by FIG. 11A, or FIG. 10B is replaced by FIG. 11B) or from tilting to lying (for example, FIG. 11A is replaced by FIG. 10A, or FIG. 11B is replaced by FIG. 10B). When the power source 48 and the driving element 49 are each provided in the number of two, the power source 48 drives the driving elements 49, and then the driving elements 49 drive the linkages 42 on two sides of the rotatable support boards 41 to operate such that the rotatable support boards 41 change from lying to tilting (for example, FIG. 10A is replaced by FIG. 11A, or FIG. 10B is replaced by FIG. 11B) or from tilting to lying (for example, FIG. 11A is replaced by FIG. 10A, or FIG. 11B is replaced by FIG. 10B). Therefore, when tilting, the last rotatable support board 41 creates a gap whereby the living thing's excrement falls into the temporary storage region (not shown).

Referring to FIG. 1, FIG. 3 and FIG. 10A through FIG. 12, in the aforesaid embodiment, one end of the rotation rod 37 has a rotation gear 372, whereas the end portion of the driving element 49 has a forwarding rack 491. The forwarding rack 491 meshes with and drives the rotation gear 372 in the course of rotating the rotatable support boards 41 to change from lying to tilting. After the rotatable support boards 41 have rotated enough to change from tilting to lying, the forwarding rack 491 separates from the rotation gear 372. Therefore, in the course of rotating the rotatable support boards 41 to change from lying to tilting, the rotation gear 372 and the rotation rod 37 rotate the rotation harrow 35 of the L-shaped grates 351 such that solid excrement can be forwarded to the collection region 23.

Figure 13:
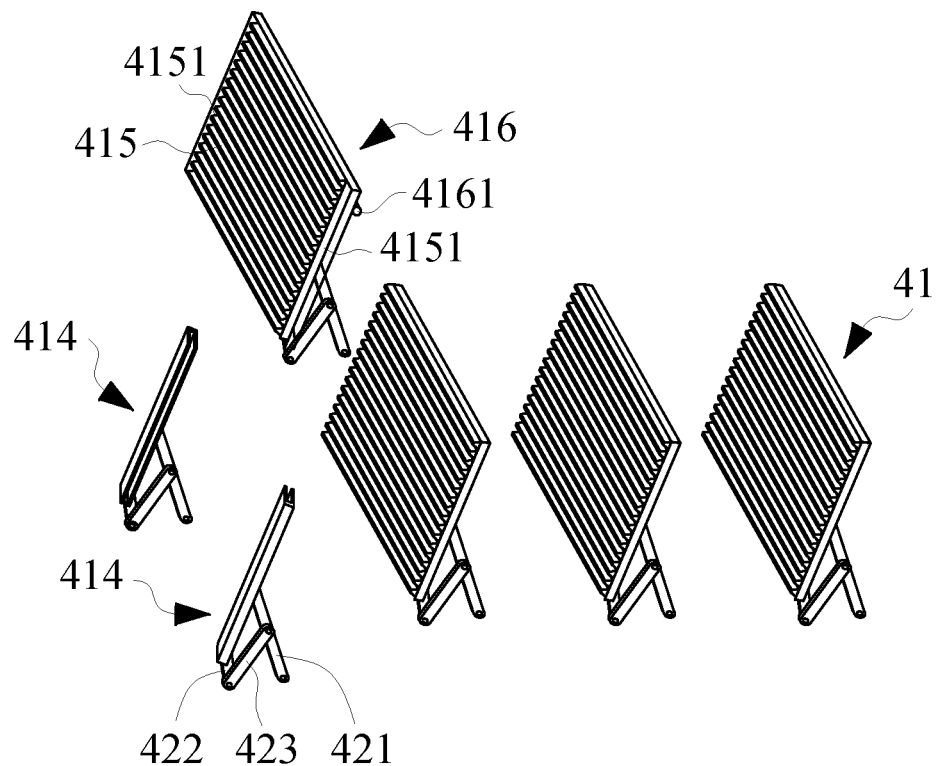
FIG. 13 is a schematic view of rotatable support boards each comprising two support stands and a support board according to an embodiment of the present disclosure.
Figure 14:
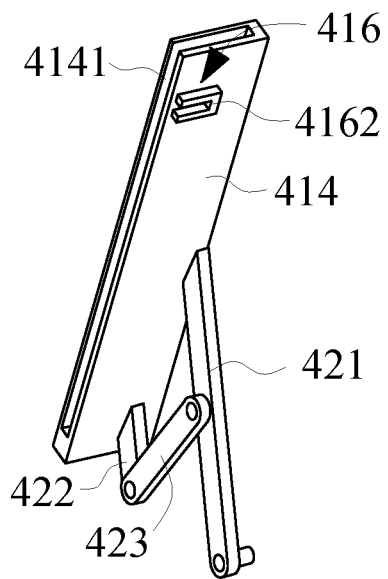
FIG. 14 is a schematic view of support stands and a demountable fixing element of the rotatable support board according to an embodiment of the present disclosure.
Figure 15:
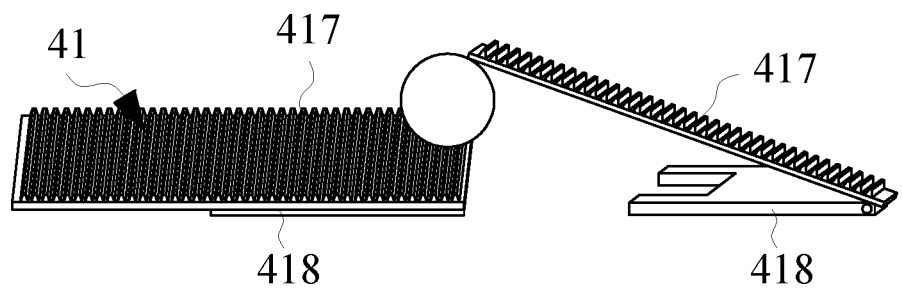
FIG. 15 is a schematic view of the rotatable support boards, with a foreign body clamped therebetween, according to an embodiment of the present disclosure.
Figure 16:
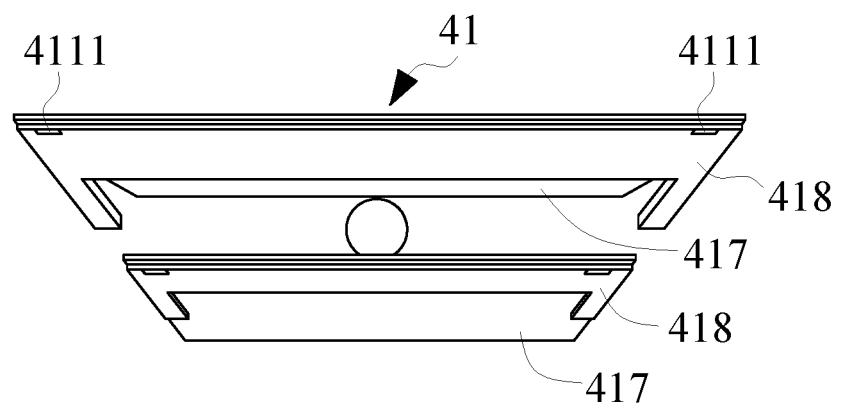
FIG. 16 is a schematic view of the rotatable support boards, with another foreign body clamped therebetween, according to an embodiment of the present disclosure.
Figure 17:
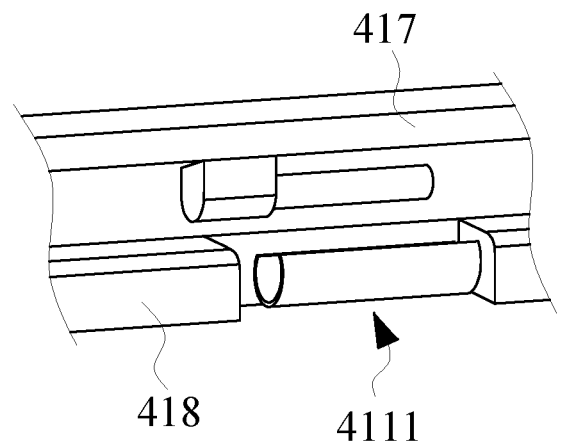
FIG. 17 is a schematic view of the rotatable support board, showing its substrate and its support board privotally connected, according to an embodiment of the present disclosure.
Figure 18:
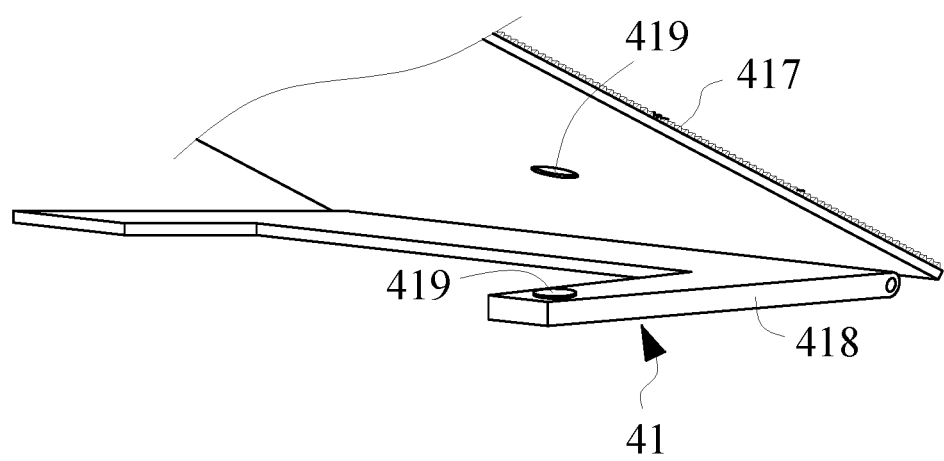
FIG. 18 is a schematic view of the rotatable support board with magnet components according to an embodiment of the present disclosure.

Referring to FIG. 13 and FIG. 14, in an embodiment, the rotatable support boards 41 each comprise two support stands 414, a support board 415 and a demountable fixing element 416. The support stands 414 are each pivotally connected to one end of the long rod 421 and one end of the short rod 422. The support stands 414 each have a fixing slot 4141. After having tilted, the fixing slots 4141 have their bottoms closed so as to block the support board 415. Two short edges of the support board 415 each have a fixing flange 4151. The fixing flanges 4151 are disposed in the fixing slots 4141, respectively. The demountable fixing element 416 fixes the support board 415 to the support stands 414. The demountable fixing element 416 has a pin 4161 and a pin holder 4162. The pin 4161 is disposed on the back of the support board 415. The pin holder 4162 is disposed on the back of each support stand 414. The pin 4161 is inserted into the pin holder 4162 such that either the support board 415 is fixed to the support stand 414 or the pin 4161 exits the pin holder 4162 to therefore separate the support board 415 from the support stand 414, thereby allowing the support board 415, the support stands 414 and the temporary storage region (not shown) to be cleansed.

Referring to FIG. 15 through FIG. 18, in an embodiment, the rotatable support boards 41 each comprise a support board 417, a substrate 418 and a magnet component 419. The substrate 418 is smaller than the support board 417. The substrate 418 and the support board 417 are attracted to each other by the magnet component 419. The magnet component 419 consists of two magnets which are magnetically opposite. The substrate 418 drives the support board 417 to rotate. A point of pivotal connection 4111 is disposed between the substrate 418 and the support board 417 and corresponds in position to the rotation side of the rotatable support boards 41. The point of pivotal connection 4111 has an axle and a bushing which are disposed on the support board 417 and the substrate 418, respectively. Therefore, if a foreign body happens to be clamped by and between the rotatable support boards 41 in the course of rotation thereof by changing from tilting to lying because of the substrate 418, the support board 417 rotates about the point of pivotal connection 4111 and thus separates from the substrate 418, so as to protect the rotatable support boards 41 against damage. Upon removal of the foreign body, the support board 417 and the substrate 418 are attracted to each other by the magnet component 419.

In the aforesaid embodiments, the excrement collection device 100 (101, 102) further comprises a sensing component and an information integration component 69. The sensing component senses whether the pets have entered the support component 40 or senses the status of the cleansing sand and the excrement in the receiving space 20. The information integration component 69 collects the sensing-related results of the sensing component and controls the excrement collection device in accordance with the sensing-related results. In this embodiment, the information integration component 69 is, for example, disposed in the collection box 60 (shown in FIG. 6), but the present disclosure is not limited thereto. Instead, the information integration component 69 may also be disposed at any other appropriate position in the excrement collection device 100 (101, 102) as needed.

In an embodiment, the sensing component comprises at least a first sensor 81. The at least a first sensor 81 is disposed at the support component 40 (40') to sense the pets' usage status. For instance, a plurality of infrared sensors is defined as a first sensor 81. The infrared sensors sense for the pets' entry to or exit from the excrement collection device 100 (101, 102). The at least a first sensor 81 is, for example, disposed on a portion of the rotatable support boards 41 or on the fence 45. In some other embodiments, the information integration component 69 controls the rotation control element 43 and further controls the rotating shafts 411 of the rotatable support boards 41 according to the sensing-related results of the sensors.

For instance, if the at least a first sensor 81 senses the entry of the pets to the excrement collection device 100 (101, 102), the rotation control element 43 will refrain from rotating the rotating shafts 411 of the rotatable support boards 41, so as to protect the pets against accidents or injuries otherwise caused by the rotation of the rotatable support boards 41.

In an embodiment, the sensing component comprises at least a second sensor 82. The at least a second sensor 82 is disposed at the collection region 23. For instance, the at least a second sensor 82 comprises a plurality of infrared sensors and chips and is disposed in the collection box 60. For instance, vertical infrared sensors disposed in the urine collection component 61 sense the pets' urination frequency and urine amount, whereas the chips sense the specific weight of the urine. Alternatively, horizontal infrared sensors disposed in the feces collection component 63 senses feces capacity and sends a notice as soon as the specific capacity (say 50%, 80%, 100%) is reached. For instance, an LED lamp disposed on the casing 10 (or the fence 45) emits light continuously or intermittently to inform the pet keepers that the feces collected in the feces collection component 63 has reached the specific capacity. In some other embodiments, the at least a second sensor 82 comprises a weight sensor. The weight sensor is disposed in the urine collection component 61. Compared with the vertical infrared sensors, the weight sensor senses changes in the urine collection component 61 more accurately whenever there is few pets' urine and further obtains related information, such as pets' urination frequency and urine amount.

In an embodiment, the sensing component comprises at least a third sensor 83. The at least a third sensor 83 is disposed in the temporary storage region 21. For instance, the at least a third sensor 83 is a camera. The camera takes pictures of the ongoing status in the temporary storage region 21 and thereby obtains information pertaining to the pets' defecation frequency, feces color and feces shape. Furthermore, with the pictures taken by the camera, it is practicable to determine whether the pets suffer from diarrhea characterized by loose, watery stools, determine the water content of feces according to shape indicated by color temperature, and determine feces shape, such as a fried egg served sunny side up (with feces indicated by the yolk, and liquid indicated by egg white), ball-shaped (feces in good shape), and scattered (constipation).

In an embodiment, the at least a third sensor 83 is disposed on the sand plate 313. In this embodiment, the at least a third sensor 83 comprises an infrared distance sensor and a vibrator. Considering the cleansing component 30 consumes the cleansing sand while pushing and delivering the pets' solid excrement, the infrared distance sensor and the vibrator are useful in determining the cleansing sand content and sending a notice as soon as the cleansing sand content is less than a specific content.

In the embodiment, the information integration component 69 collects the sensing-related results of the at least a first sensor 81, the at least a second sensor 82 and the at least a third sensor 83. Furthermore, in some other embodiments, the information integration component 69 controls the excrement collection device 100 (101, 102) in accordance with the results, so as to take a corresponding action.

Figure 19:
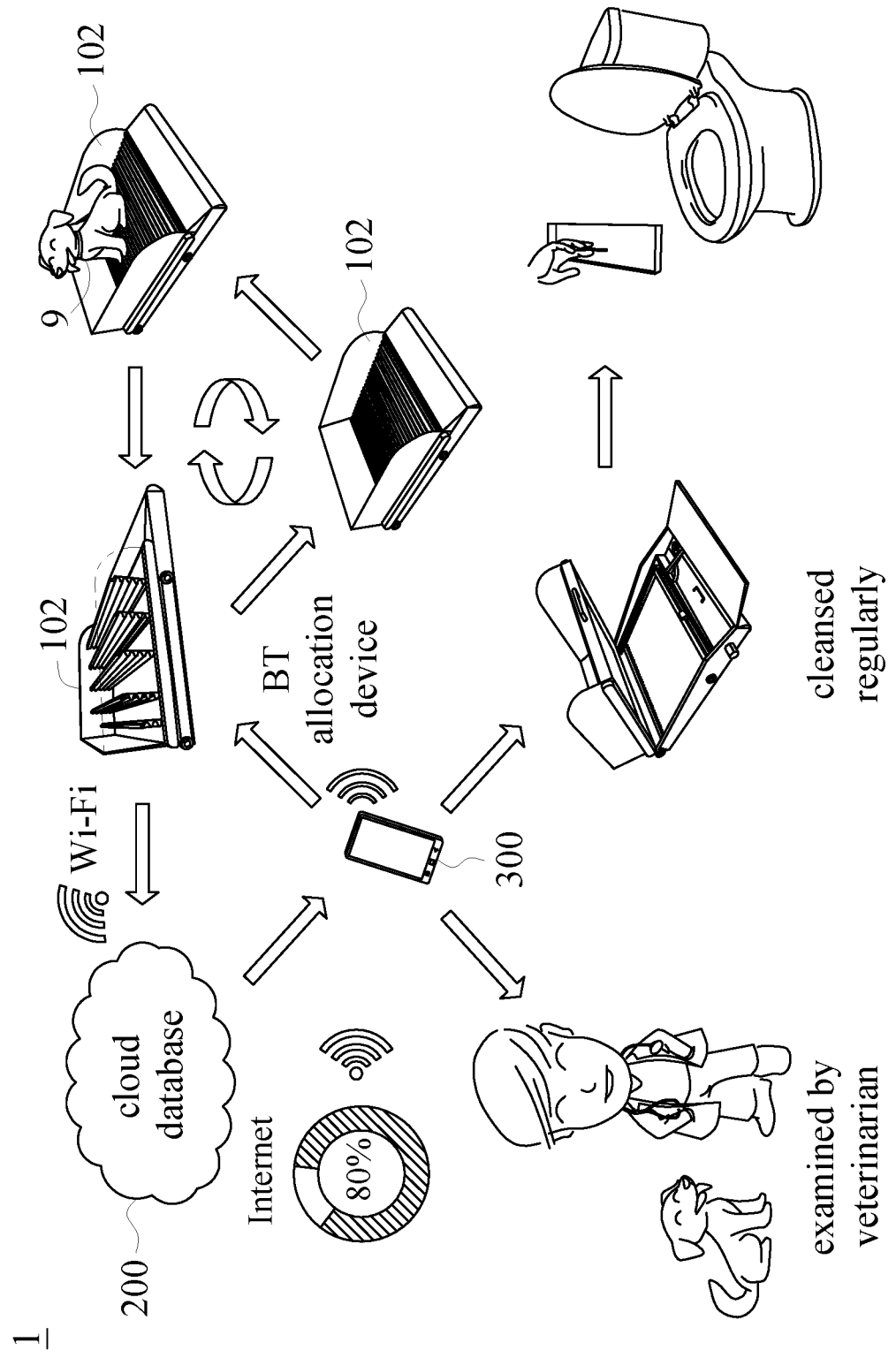
FIG. 19 is a schematic view of a smart excrement collection system according to an embodiment of the present disclosure.

Referring to FIG. 2 and FIG. 19, in an embodiment, the excrement collection device 100 further comprises a living thing electronic wearable device 9 to be worn by a living thing (for example, a pet). The sensing component (such as first sensor 81) senses the living thing electronic wearable device 9. Therefore, the excrement collection device 100 uses the sensing component and the living thing electronic wearable device 9 to confirm that the living thing admitted to the excrement collection device 100 is a pet before related operations begin.

FIG. 19 is a schematic view of a smart excrement collection system 1 according to an embodiment of the present disclosure. The smart excrement collection system 1 comprises the excrement collection device 100 (101, 102), a cloud database 200 and a receiving device 300.

In this embodiment, the information integration component 69 of the excrement collection device 100 (101, 102) further comprises a wireless transmitter 691. The wireless transmitter 691 transmits information collected by the information integration component 69. The cloud database 200 receives, stores and transmits information transmitted from the wireless transmitter 691. The receiving device 300 directly receives information transmitted from the wireless transmitter 691 or accesses information stored in the cloud database.

For instance, information (for example, the sensing-related results of the at least a first sensor 81, the at least a second sensor 82 and the at least a third sensor 83) collected by the information integration component 69 is transmitted to the cloud database 200 through the wireless transmitter 691 by wireless area network technology, such as Wi-Fi, whereas information transmitted from the wireless transmitter 691 is received, stored and transmitted by the cloud database 200.

The receiving device 300 is, for example, a cellular phone, tablet, PDA, and PC. The receiving device 300 is, for example, enabled by wireless communication technology, such as Bluetooth and near-field communication (NFC), to directly receive information transmitted from the wireless transmitter 691. Alternatively, the receiving device 300 accesses information stored in the cloud database 200 by communication technology, such as wired networks and wireless networks, with an application (app) (mounted on a cellular phone, for example). Therefore, information collected by the information integration component 69 of the excrement collection device 100 (101, 102) is obtained by the pet keepers with the receiving device 300 in the aforesaid manner.

In an embodiment, the cloud database 200 further integrates and analyzes information transmitted from the wireless transmitter 691. For instance, the cloud database 200 is capable of computing and editing information transmitted from the wireless transmitter 691 and sending a reminder to the receiving device 300, for example, pushing the reminder in the form of a notice to the pet keepers' cellphone applications to inform the pet keepers of the pets' status of defecation and urination through the excrement collection device 100 (101, 102) even though the pets are not around. For instance, with the camera taking pictures of the state in the temporary storage region 21, the pet keepers can watch the state in the temporary storage region 21 with cellphone applications and thus are well informed of the pets' physical condition. Alternatively, when the horizontal infrared sensors sense that the feces in the feces collection component 63 has reached a specific capacity (say 50%, 80%, 100%), the cloud database 200 pushes a reminder in the form of a notice to the pet keepers' cellphone applications to urge the pet keepers to clean the excrement collection device 100 (101, 102) and replace consumables timely.

An embodiment of the smart excrement collection system 1 is illustrated by FIG. 10 and described below. Although the description below and FIG. 10 are exemplified by the excrement collection device 102, the present disclosure is not limited thereto. Instead, the excrement collection device 102 is replaced by the excrement collection device 100 or the excrement collection device 101.

First, the pets are admitted to the excrement collection device 102 to defecate and urinate on the support component 40. At this point in time, at least a first sensor 81 senses the pets' admittance, and the information integration component 69 allows the rotatable support boards 41 of the support component 40 to maintain the horizontal state thereof.

Assuming that the pets leave behind both urine (liquid excrement) and feces (solid excrement) after leaving the excrement collection device 102, and the rotatable support boards 41 stay in the horizontal state for around 20~30 seconds. At this point in time, the pets' urine is drained by the troughs 41T of the rotatable support boards 41 to the urine drainage channel 211. Afterward, the information integration component 69 controls the rotation control element 43 to rotate the rotating shafts 411 (for around 5 seconds) such that the rotatable support boards 41 are rotated to take on the vertical (or oblique) state and stay therein for around 10 seconds. At this point in time, the pets' feces pass through the gaps between the rotatable support boards 41 and fall into the temporary storage region 21 (the feces temporary storage zone 213). The urine drained to the urine drainage channel 211 is drained continuously by the urine drainage channel 211 to the urine collection component 61 of the collection box 60.

After the pets' feces have fallen into the temporary storage region 21 (the feces temporary storage zone 213), the information integration component 69 controls the rotation control element 43 to rotate the rotating shafts 411 (for around 5 seconds) such that the rotatable support boards 41 are rotated to restore the horizontal state thereof and thus become available for use in the next instance of the pets' admittance. After the pets' feces have fallen into the temporary storage region 21 (the feces temporary storage zone 213) and stayed therein for around 20 seconds, a third sensor 83 (for example, a camera) takes pictures of the state (the state of the feces) in the temporary storage region 21 to therefore gather information pertaining to the pets' defecation frequency, feces color, and feces shape.

Afterward, the push harrow 31 pushes feces such that the feces are enclosed by the cleansing sand. Then, the blades 311 push the feces to the junction of the temporary storage region 21 and the collection region 23. The pushing process lasts around 60 seconds. Upon completion of the pushing process, the push harrow 31 moves backward along the push route to return to the initial position thereof, whereas another third sensor 83 determines the cleansing sand content.

After the pets have entered the excrement collection device 102 again to defecate and urinate and exited the excrement collection device 102, the rotatable support boards 41 stay in the horizontal state for around 20~30 seconds. Afterward, the information integration component 69 controls the rotation control element 43 to rotate the rotating shafts 411 (for around 5 seconds) such that the rotatable support boards 41 are rotated to take on the vertical (or oblique) state. At this point in time, the solid excrement (feces) previously pushed by the push harrow 31 to the junction of the temporary storage region 21 and the collection region 23 is delivered by the L-shaped grates 351 of the rotation harrow 35 to the feces collection component 63 of the collection box 60. The delivery process takes around 5~10 seconds. At the end of the delivery process, the rotation harrow 35 rotates backward along the delivery route to return to the initial position thereof. Afterward, the rotatable support boards 41 are rotate to restore the horizontal state thereof.

In this embodiment, the rotation harrow 35 rotates while the rotatable support boards 41 are in the vertical (or oblique) state to preclude mutual interference between the rotation harrow 35 and the other components in the excrement collection device 102, further reduce the volume of the excrement collection device 102, and minimize the duration of the vertical (or oblique) state of the rotatable support boards 41, thereby protecting the pets against danger.

While the aforesaid process is taking place, i.e., while the rotatable support boards 41 are in the vertical (or oblique) state, the at least first sensor 81 senses the admittance of the pets or the pet keepers' hands, and the information integration component 69 immediately controls the components in the excrement collection device 102 to stop operating, so as to protect the pets or the pet keepers against danger. It is only when the pets or the pet keepers' hands exit the excrement collection device 102 that the operation of the components resumes.

At least a second sensor 81 disposed in the collection region 23 senses related information, that is, the pets' urine frequency, urine amount, urine specific weight, and feces capacity. The information integration component 69 keeps collecting the sensing-related results of the at least a first sensor 81, the at least a second sensor 82 and the at least a third sensor 83.

The information collected by the information integration component 69 is transmitted by the wireless transmitter 691 to the cloud database 200. The information transmitted by the wireless transmitter 691 is received by and stored in the cloud database 200. Even if their pets are not around, the pet keepers can still access information stored in the cloud database 200, by communication technology, such as wired networks and wireless networks, with the receiving device 300, so as to be informed of the pets' defecation and urination and thus the pets' physical condition.

Alternatively, when the pet keepers are around the excrement collection device 102, the pet keepers can directly receive by wireless communication technology the information transmitted from the wireless transmitter 691, so as to be informed of the pets' defecation and urination and thus the pets' physical condition.

The cloud database 200 integrates and analyzes the information transmitted from the wireless transmitter 691. Upon detection of abnormality of the pets' defecation and urination and thus physical condition, the cloud database 200 sends a reminder to the receiving device 300, for example, pushes a notice to the pet keepers' cellular phones to urge the pet keepers to take the pets to animal hospital for medical checkup as soon as possible. Alternatively, when the excrement collection device 102 has to be cleansed or must have its consumables replaced, the cloud database 200 sends a reminder to the receiving device 300.

With the excrement collection device in the embodiments of the present disclosure, excrement left behind by the pets at home as a result of the pets' defecation and urination is gathered in the collection region, so as to spare the pet keepers the hassles of frequent cleansing, prevent exposure of the excrement to air for a long period of time, and preclude a foul-smelling odor which might other linger at home. Even if the pet keepers allow their pets to stay at home while they are working overtime, traveling on business, or travelling on vacation, the excrement collection device will keep operating, thereby overcoming known drawbacks of the prior art. In addition, the excrement collection device in the aforesaid embodiments of the present disclosure is aesthetically attractive and practical. Moreover, the excrement collection device in the aforesaid embodiments of the present disclosure comes with a safety mechanism for protecting the pets and the pet keepers against accidents which might other happen while the excrement collection device is in operation.

In a smart excrement collection system according to an embodiment of the present disclosure, the sensing component monitors the state of the excrement collection device in real time. Hence, even if their pets are not around, the pet keepers can still be informed, by the excrement collection device's information integration component, the cloud database and the pet keepers' receiving devices (such as cellular phones), of collection state of the excrement in the excrement collection device, so as to gain insight into the pets' physical condition and determine whether to cleanse the excrement collection device or replace consumables. This is beneficial to those pet keepers who are unable to accompany their pets for a long period of time, because related information is provided to the pet keepers conveniently and instantly.

The present disclosure is disclosed above by preferred embodiments. However, persons skilled in the art should understand that the preferred embodiments are illustrative of the present disclosure only, but shall not be interpreted as restrictive of the scope of the present disclosure. Hence, all equivalent modifications and replacements made to the aforesaid embodiments shall fall within the scope of the present disclosure. Accordingly, the legal protection for the present disclosure shall be defined by the appended claims.

What is claimed is:

1. An excrement collection device, comprising:
    a casing comprising a bottom wall, two opposing first outer sidewalls, and a second outer sidewall connecting the first outer sidewalls;
    a receiving space defined by the bottom wall, the first outer sidewalls, and the second outer sidewall and divided into a temporary storage region and a collection region, with the temporary storage region disposed between the second outer sidewalls and the collection region;
    a cleansing component disposed in the temporary storage region; and
    a support component disposed at a top of the temporary storage region and comprising a plurality of rotatable support boards.

2. The excrement collection device of claim 1, wherein the cleansing component comprises:
    a push harrow having a plurality of blades;
    a push rod for carrying the push harrow and pushing the push harrow, causing the push harrow to move within the temporary storage region along a specific route;
    a rotation harrow disposed at a junction of the temporary storage region and the collection region and having a plurality of L-shaped grates; and
    a rotation rod for carrying the rotation harrow and rotating the rotation harrow.

3. The excrement collection device of claim 2, wherein the push harrow has a sand plate disposed at a top of the blades and movable to a bottom of the blades.

4. The excrement collection device of claim 2, wherein an end of the rotation rod has a rotation gear, and the support component further comprises a plurality of linkages, at least a power source and at least a driving element, the power source being connected to the driving element, wherein an end portion of the driving element has a forwarding rack, with the linkages disposed at two short edges of each said rotatable support board, wherein the linkages each comprise a long rod, a short rod and a connecting rod, wherein an end of the long rod and an end of the short rod are pivotally connected to short edges of each said rotatable support board, wherein another end of the long rod is pivotally connected to the casing, wherein another end of the short rod is pivotally connected to the driving element, wherein the connecting rod has an end pivotally connected between two ends of the long rod and another end pivotally connected to another end of the short rod, wherein the forwarding rack drives the rotation gear while the rotatable support boards are rotating to change from lying to tilting, wherein the forwarding rack separates from the rotation gear after the rotatable support boards have rotated to change from tilting to lying.

5. The excrement collection device of claim 1, wherein a top of each said rotatable support board has a plurality of troughs each extending along two long sides of the rotatable support board.

6. The excrement collection device of claim 5, wherein the casing further comprises a urine drainage channel for draining urine from the troughs to the collection region.

7. The excrement collection device of claim 6, further comprising a collection box disposed in the collection region and having a feces collection component and a urine collection component, the urine drainage channel draining urine to the urine collection component, and the cleansing component pushing feces in the temporary storage zone to the feces collection component.

8. The excrement collection device of claim 7, wherein the collection box further comprises an odor processing component in communication with at least one of the feces collection component and the urine collection component.

9. The excrement collection device of claim 7, wherein the collection box further comprises a urine processing component being in communication with the urine collection component and feeding automatically a specific liquid to the urine collection component.

10. The excrement collection device of claim 5, wherein the troughs have at least one of a hydrophobic coating and a photocatalyst coating.

11. The excrement collection device of claim 1, wherein the rotatable support boards each comprise:
   a rotating shaft disposed on a long side of each said rotatable support board to rotate the rotatable support board;
   an engaging slot disposed on another long side of each said rotatable support board to engage with the rotating shaft of an adjacent one of the rotatable support boards; and
   a rotation control element disposed on at least one of the first outer sidewalls to rotate the rotating shaft of each said rotatable support board.

12. The excrement collection device of claim 1, wherein the support component further comprises a fence corresponding in position to the first outer sidewalls and the second outer sidewall.

13. The excrement collection device of claim 1, wherein the support component further comprises a plurality of linkages, at least a power source and at least a driving element, the power source being connected to the driving element, the linkages being disposed at two short edges of each said rotatable support board, the linkages each comprising a long rod, a short rod and a connecting rod, wherein an end of the long rod and an end of the short rod are pivotally connected to the short edges of each said rotatable support board, the long rod having another end pivotally connected to the casing, the short rod having another end pivotally connected to the driving element, wherein the connecting rod has an end pivotally connected between two ends of the long rod and another end pivotally connected to another end of the short rod.

14. The excrement collection device of claim 1, wherein the rotatable support boards each comprise two support stands, a support board and a demountable fixing element, the support stands each having a fixing slot, with a fixing flange disposed on each of two short edges of the support board, with the fixing flanges disposed in the fixing slots, respectively, with the demountable fixing element adapted to fix the support board to the support stands.

15. The excrement collection device of claim 1, wherein the rotatable support boards each comprise a support board, a substrate and a magnet component, the substrate being smaller than the support board, wherein the support board and the substrate are attracted to each other because of the magnet component, the substrate driving the support board to rotate, wherein a point of pivotal connection of the substrate and the support board corresponds in position to a rotation side of the rotatable support boards.

16. The excrement collection device of claim 1, further comprising:
   a sensing component for sensing whether a living thing has entered the support component or sensing a state of cleansing sand and excrement in the receiving space; and
   an information integration component for collecting a sensing result of the sensing component and controlling the excrement collection device according to the sensing result.

17. The excrement collection device of claim 16, wherein the sensing component comprises at least a first sensor disposed at the support component.

18. The excrement collection device of claim 16, wherein the sensing component comprises at least a second sensor disposed at the collection region.

19. The excrement collection device of claim 16, wherein the sensing component comprises at least a third sensor disposed at the temporary storage region.

20. The excrement collection device of claim 16, further comprising a living thing electronic wearable device sensed by the sensing component.

21. A smart excrement collection system, comprising:
   the excrement collection device of claim 16, wherein the information integration component further comprises a wireless transmitter, and the wireless transmitter transmits information collected by the information integration component;
   a cloud database for receiving, storing and sending information transmitted from the wireless transmitter; and
   a receiving device for directly receiving information transmitted from the wireless transmitter or accessing information stored in the cloud database.

22. The smart excrement collection system of claim 21, wherein the cloud database further integrates and analyzes information transmitted from the wireless transmitter and sends a reminder to the receiving device.

* * * * *